(12) United States Patent
Chang

(10) Patent No.: US 9,467,734 B2
(45) Date of Patent: Oct. 11, 2016

(54) STORING METHOD AND PROCESSING DEVICE THEREOF

(71) Applicant: NOVATEK Microelectronics Corp., Hsin-Chu (TW)

(72) Inventor: Wei-Chung Chang, Taipei (TW)

(73) Assignee: NOVATEK Microelectronics Corp., Hsin-Chu (TW)

( * ) Notice: Subject to any disclaimer, the term of this patent is extended or adjusted under 35 U.S.C. 154(b) by 83 days.

(21) Appl. No.: 14/616,742

(22) Filed: Feb. 8, 2015

(65) Prior Publication Data

US 2016/0150270 A1     May 26, 2016

(30) Foreign Application Priority Data

Nov. 20, 2014  (TW) .............................. 103140268 A

(51) Int. Cl.
| | |
|---|---|
| *H04N 9/80* | (2006.01) |
| *H04N 5/917* | (2006.01) |
| *H04N 21/4335* | (2011.01) |
| *H04N 21/433* | (2011.01) |
| *H04N 5/91* | (2006.01) |

(52) U.S. Cl.
CPC ............ *H04N 21/4335* (2013.01); *H04N 5/91* (2013.01); *H04N 21/4334* (2013.01)

(58) Field of Classification Search
USPC .................................. 386/236–277, 326–342
See application file for complete search history.

(56) References Cited

U.S. PATENT DOCUMENTS

| | | | |
|---|---|---|---|
| 7,817,903 B2 | 10/2010 | Suneya | |
| 2011/0246659 A1 | 10/2011 | Bouazizi | |
| 2012/0002947 A1 | 1/2012 | Rhyu | |
| 2012/0233345 A1 | 9/2012 | Hannuksela | |

FOREIGN PATENT DOCUMENTS

| | | |
|---|---|---|
| CN | 102870424 A | 1/2013 |
| TW | 200847783 | 12/2008 |
| TW | 200929238 | 7/2009 |

*Primary Examiner* — Hung Dang
(74) *Attorney, Agent, or Firm* — Winston Hsu; Scott Margo

(57) ABSTRACT

A storing method comprises sequentially storing at least one first media content into at least one first fragment of a storage device, and storing corresponding at least one first media metadata into a first media metadata writing storage window; and when the storage device reaches a storage limit and at least one second media content and corresponding at least one second media metadata are intended continuously to be stored into the storage device, converting the first media metadata writing storage window into a second media metadata reserving storage window to reserve the at least one first media metadata, and sequentially overwriting at least one second fragment of the storage device with the at least one second media content and storing the corresponding at least one second media metadata into a second media metadata writing storage window.

26 Claims, 22 Drawing Sheets

STORING METHOD AND PROCESSING
DEVICE THEREOF

BACKGROUND OF THE INVENTION

1. Field of the Invention

The present invention relates to a storing method and processing device thereof, and more particularly, to a storing method and processing device thereof capable of safely storing captured image data.

2. Description of the Prior Art

Monitoring equipment is very popular in recent years, a video recording system such as a camera, an event data recorder or wearable mobile camera can be seen everywhere for monitoring or recording. Since a monitoring equipment usually needs to record image for a long time, and store captured images into a storage device which usually has limited capacity, the monitoring equipment needs to have the functionality of loop recording. For example, if the storage device can only 5-hour-long video and audio file, when the captured image data is longer than 5 hour, oldest image data is deleted for saving new image data.

Current multi-media formats are mainly MPEG-4 Part 14 (MP4) or QuickTime (QT). Formats MP4 or QT can be normal and fragmented. Normal format stores media content in one media content container (such as MDAT) related to a document, and stores metadata in one metadata container (such as MOOV) of one document. Conventionally, the media content container includes practically media sampling, such as video and/or audio frame. Each media has itself metadata track (TRAK) in the metadata container MOOV for describing characteristics of the media content such as encoding level, bit rate, frame rate, interval. Additional container of the metadata container MOOV includes information related to characteristics of document and document content.

Please refer to FIG. 1, which is a schematic diagram of a conventional monitoring equipment performing storing when a storage format is normal storage format. As shown in FIG. 1, take a blank Secure Digital card (SD card) which is formatted as FAT32 file system as example, every 5 minutes long media data is divided as an audio and video file and it already records 5 minutes and 20 seconds long media data. The first audio and video file 11 of the monitoring equipment is completed and has 5 minutes long media content, and the second audio and video file 12 is recording and its metadata (index value) is stored in memory and is not yet written into the storage device (the audio and video file 12 is not completed and does not includes the metadata MOOV yet). Each divided audio and video file needs to have complete file header FTYP, media content MDAT and metadata MOOV for play.

However, during the recording process, since the metadata MOOV is usually written at last, if abnormal event such as power cut occurs before or during the metadata MOOV is written, the last audio and video file (e.g. audio and video file 12) cannot be played because the metadata MOOV is not written completely. Take an event data recorder as an example, power cut occurs as an accident occurs, and thus the key image finally captured may be damaged, thereby losing protection for the user.

Compared with the normal format, the fragmented storage format is commonly used in machine with less resource or machine which may occur power cut since the metadata (index value) and media content can be written alternatively and thus the fragmented-structure file has stronger error tolerance. Please refer to FIG. 2, which is a schematic diagram of a fragmented storage format. As shown in FIG. 2, the fragmented storage format is a media file format based on International Organization for Standardization (ISO). The fragmented storage format file is formed by multiple media content containers 23 (i.e. MDAT), corresponding multiple fragment metadata containers 22 (i.e. MOOF), and a basic shape only metadata container 21 (i.e. MOOV) which only roughly describes messages related to media such as definition and compression format. A movie fragment header (i.e. MFHD) 211 describe characteristics corresponding to the media fragments and includes sequence numbers of the media fragments. In the same file, the sequence numbers of the media fragments have to be arranged to increase progressively, otherwise the file is considered illegal.

The fragmented format needs to overwrite oldest fragments when the storage device is full and perform loop recording. Please refer to FIG. 3, which is a schematic diagram of the conventional fragmented format in a recording device with loop recording capability when the storage device is full. As shown in FIG. 3, at this moment, the oldest $1^{st}$ fragment 31 will be overwritten by the newest $N+1^{th}$ fragment 32. Since sequence numbers of media fragments in the same file have to be arranged to increase progressively and the $N+1^{th}$ fragment and its sequence number occurs before other fragments and sequence numbers thereof which is illegal, the method disclosed by U.S. Pat. No. 7,817,903B2 needs to be applied frequently to perform file system operations (e.g. modify file link in a format of FAT32) to avoid a reversed sequence. But if power cut or equipment damage occurs during file system operations, completeness of the file is damaged.

On the other hand, in order for the user to keep important fragments to avoid interested media fragments are overwritten by the above mentioned loop recording, some monitoring equipment provides an emergency recording mechanism. For example, some monitoring equipment edits one minute long media data before and after the emergency recording mechanism is activated as an emergency image file. Assume that a user activates the emergency recording mechanism after recording 5 minutes and 20 seconds long media data in a normal format, a state of the storage device at this moment is as shown in FIG. 1. Then, please refer to FIG. 4, which is a schematic diagram of allocation of the storage device when a conventional method activating emergency recording. As shown in FIG. 4, after activating emergency recording, the system will find a allocable space 43 in the storage device and write a file header (i.e. FTYP) 431. Because media files are divided as 5 minutes long per file, last 40 seconds image content 411 (slant line region) of the media content MDAT the previous audio and video file 11 and first 20 seconds image content 421 (point region) of a media content MDAT of the current audio and video file 12 are copied to the space 43. At this moment, video recording is simultaneously performed with the emergency recording mechanism.

Finally, please refer to FIG. 5, which is a schematic diagram of allocation of the storage device after the conventional method of FIG. 4 completes emergency recording. As shown in FIG. 5, 60 seconds image content 522 (mesh region) after the emergency recording is activated is copied into the space 43, and the system calculates metadata (i.e. MOOV) 534 for the edited media data to complete the emergency image file 53. During the above procedure, the system utilizes two threads, wherein a recording thread continues loop recording and an emergency recording thread reads and copies the above metadata and media content, and the two threads persistent request storage spaces from the storage device. The conventional file division method is based on play interval of a media file, since encoding bit rates are not fixed due to complexity of different recording environments, each of the divided audio and video files 11, 12 has different sizes. Besides, the emergency recording mechanism makes storage space to be further allocated for storing the emergency recording file, thereby causing the normal recording file and the emergency recording file to be stored in discontinuous storage space, generating several fragmentations in space allocation.

In addition, steps of the conventional emergency recording are complex, and perform file editing procedures of the emergency recording mechanism while performing recording simultaneously. Under a situation of performing high definition recording or a SD card with a slow storing speed, it is a big challenge to system performance. It is very likely that the captured media data lose some frames when the system performance is not enough.

Therefore, it is very important in the industry to avoid the problems of media damages due to the unwritten index information MOOV caused by power cut and reversed sequence numbers of the fragmented storage format, and to simplify complex steps of the emergency recording to reduce consumption of the system performance and avoid discontinuous storage space which causes several fragmentations in space allocation.

SUMMARY OF THE INVENTION

It is therefore an objective of the present invention to provide a storing method and processing device thereof capable of safely storing captured image data.

A storing method is provided for storing data in a storage device of a video recording system. The storing method comprises sequentially storing at least one first media content into at least one first fragment of the storage device, and storing corresponding at least one first metadata into a first metadata writing storage window of the storage device, wherein the at least one first fragment is outside of a first metadata reserving storage window and the first metadata writing storage window of the storage device; and when the storage device reaches a storage limit and at least one second media content and corresponding at least one second metadata are intended continuously to be stored in the storage device, converting the first metadata writing storage window into a second metadata reserving storage window to reserve the at least one first metadata, and sequentially overwriting at least one second fragment of the storage device with the at least one second media content and storing the corresponding at least one second metadata into a second metadata writing storage window of the storage device, wherein the at least one second fragment is outside of the second metadata reserving storage window and the second metadata writing storage window; wherein the first metadata writing storage window follows the first metadata reserving storage window, and the second metadata writing storage window follows the second metadata reserving storage window.

A processing device is provided in a video recording system for storing data in a storage device of the video recording system. The processing device comprises a processor, for execute a program; and a memory, coupled to the processor, for store the program; wherein the program instructs the processor to perform the following steps: sequentially storing at least one first media content into at least one first fragment of the storage device, and storing corresponding at least one first metadata into a first metadata writing storage window of the storage device, wherein the at least one first fragment is outside of a first metadata reserving storage window and the first metadata writing storage window of the storage device; and when the storage device reaches a storage limit and at least one second media content and corresponding at least one second metadata are intended continuously to be stored in the storage device, converting the first metadata writing storage window into a second metadata reserving storage window to reserve the at least one first metadata, and sequentially overwriting at least one second fragment of the storage device with the at least one second media content and storing the corresponding at least one second metadata into a second metadata writing storage window of the storage device, wherein the at least one second fragment is outside of the second metadata reserving storage window and the second metadata writing storage window; wherein the first metadata writing storage window follows the first metadata reserving storage window, and the second metadata writing storage window follows the second metadata reserving storage window.

These and other objectives of the present invention will no doubt become obvious to those of ordinary skill in the art after reading the following detailed description of the preferred embodiment that is illustrated in the various figures and drawings.

DETAILED DESCRIPTION

Figure 6:
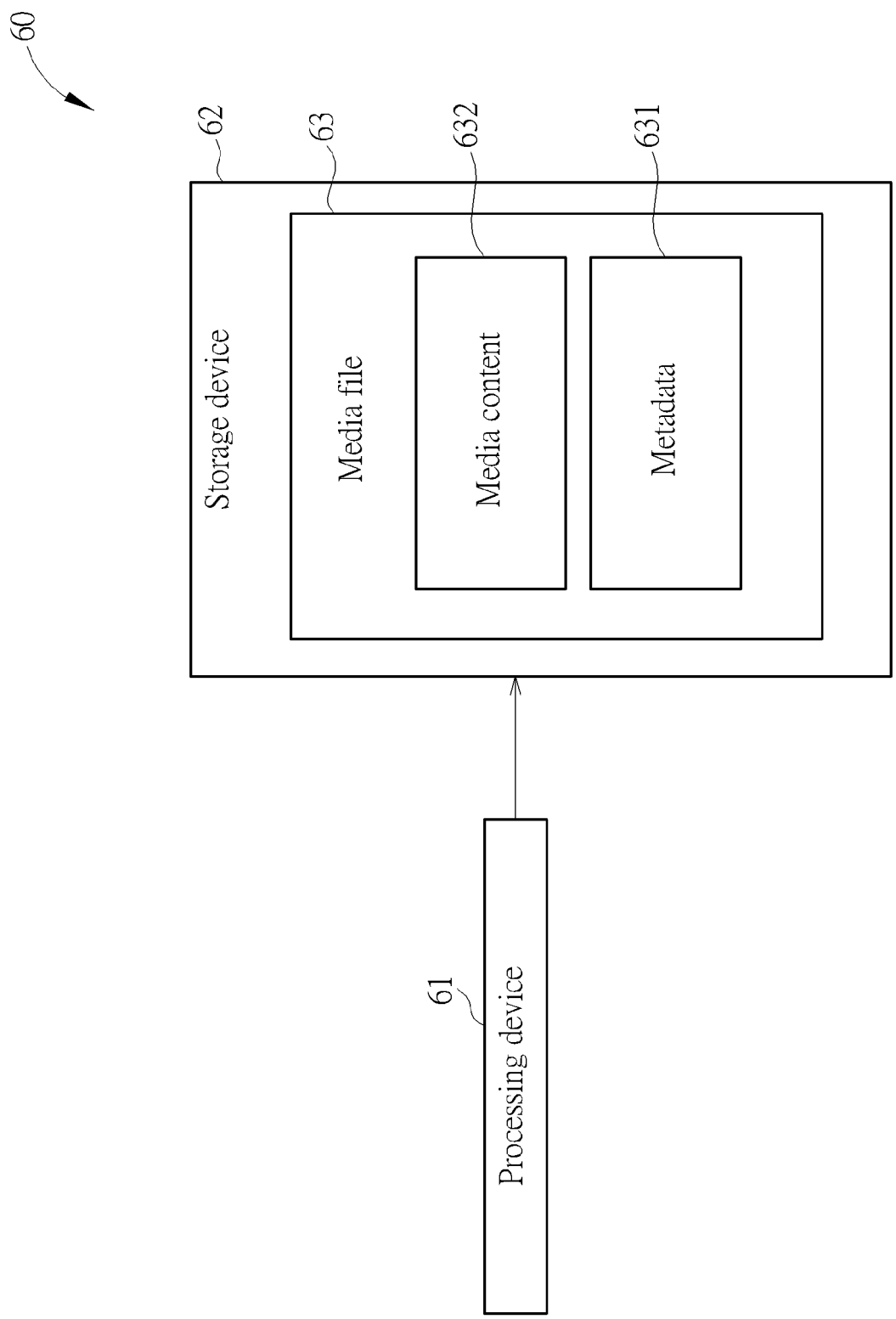
FIG. 6 is a schematic diagram of a video recording system according to an embodiment of the present invention.

Please refer to FIG. 6, which is a schematic diagram of a video recording system 60 according to an embodiment of the present invention. As shown in FIG. 6, the video recording system 60 comprises a processing device 61 for analyzing and processing multiple media files 63, and a storage device 62 for storing the above media files 63 and other data. The storage device 62 can be but not limited to a Secure Digital card (SD card) and has a storage limit. The media file 63 further comprises a metadata 631 (index data) and a media content 632, wherein the video recording system 60 can is a monitoring system or other systems.

Figure 1:
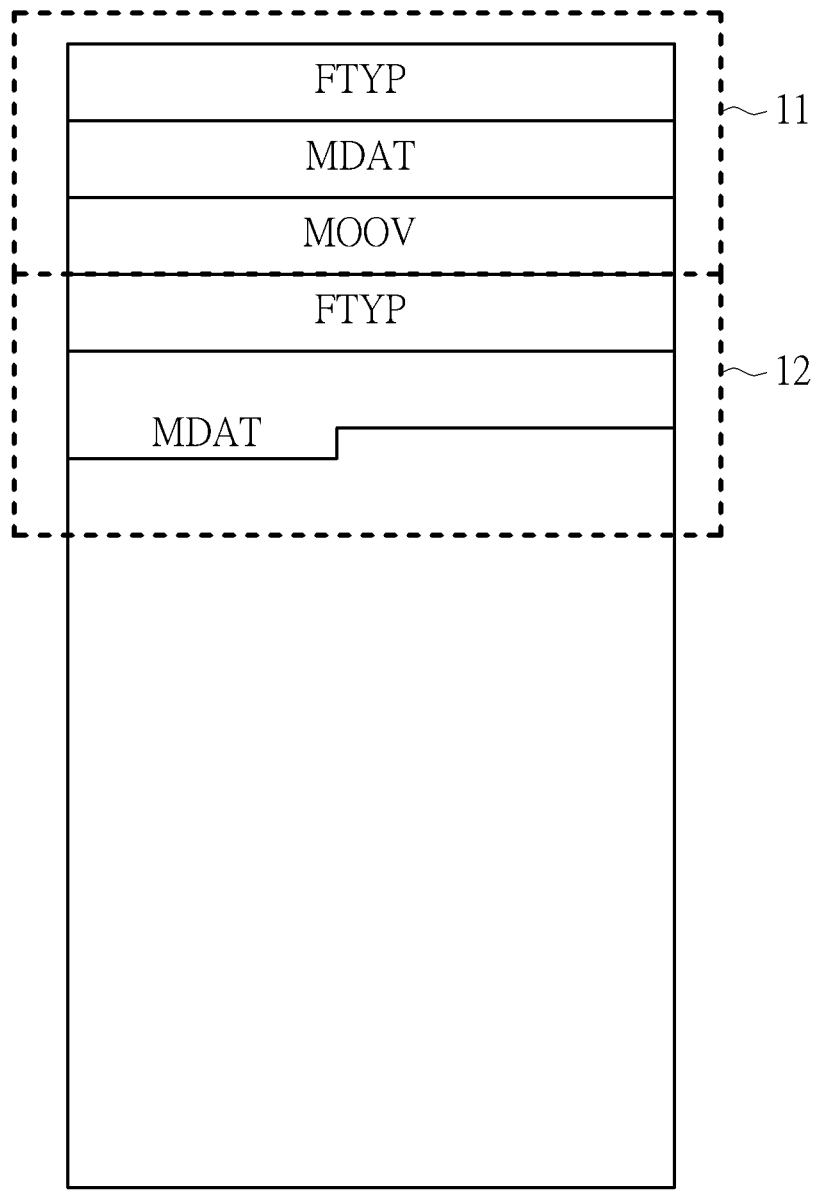
FIG. 1 is a schematic diagram of a conventional monitoring equipment performing storing when a storage format is normal storage format.
Figure 2:
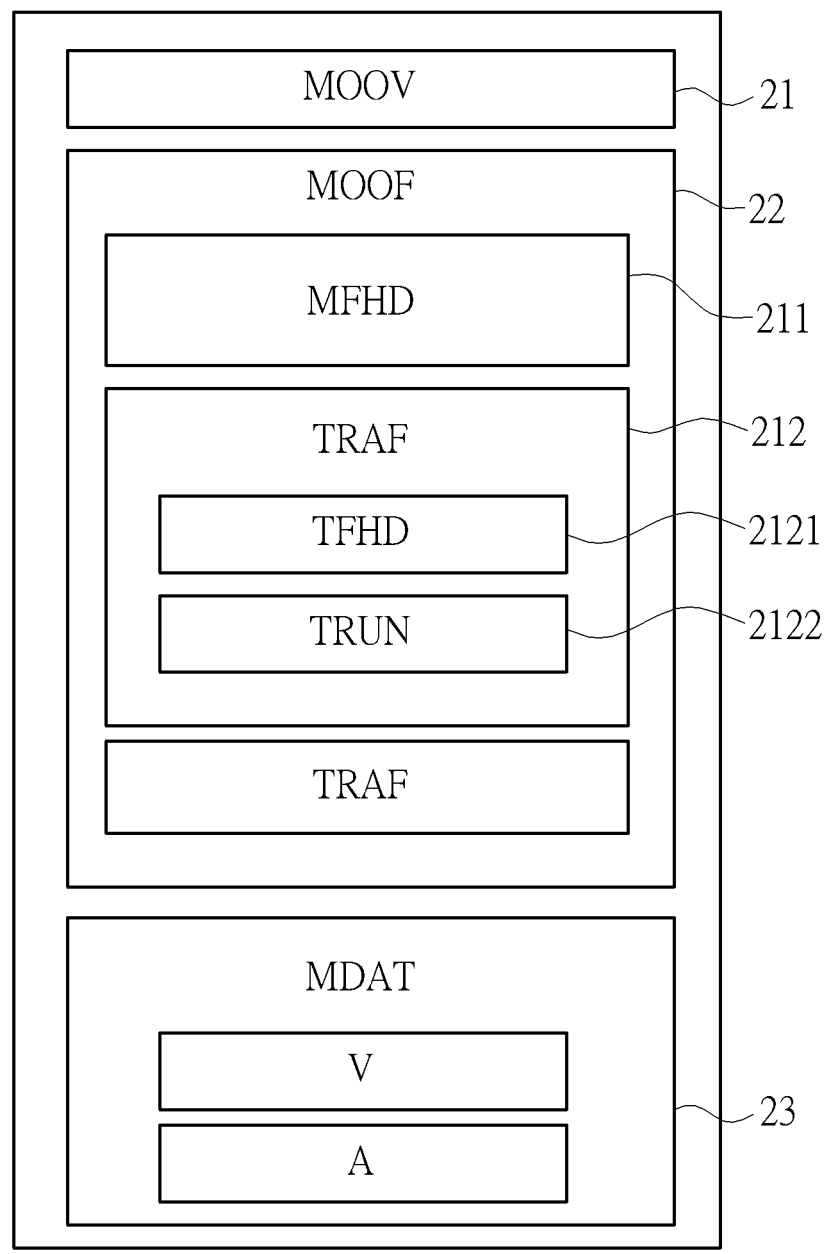
FIG. 2 is a schematic diagram of a fragmented storage format.
Figure 3:
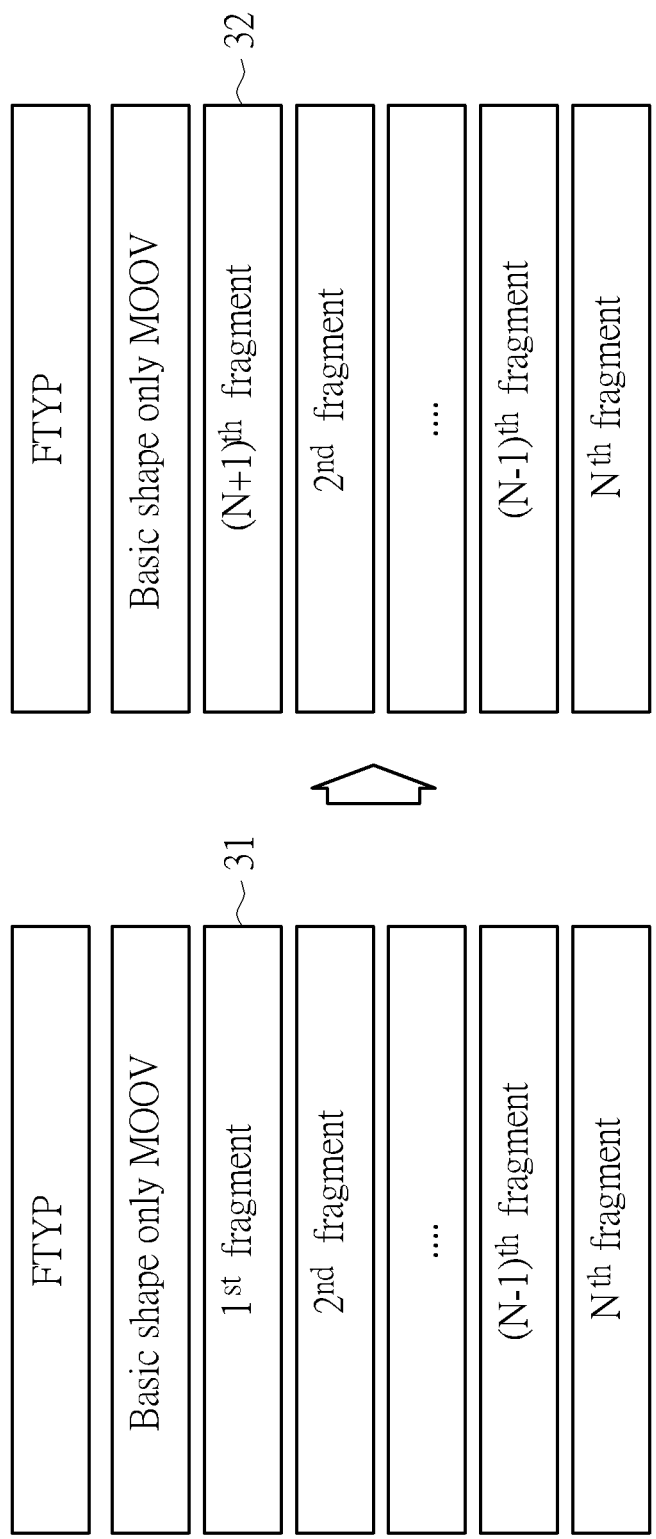
FIG. 3 is a schematic diagram of the conventional fragmented format in a recording device with loop recording capability when the storage device is full.
Figure 4:
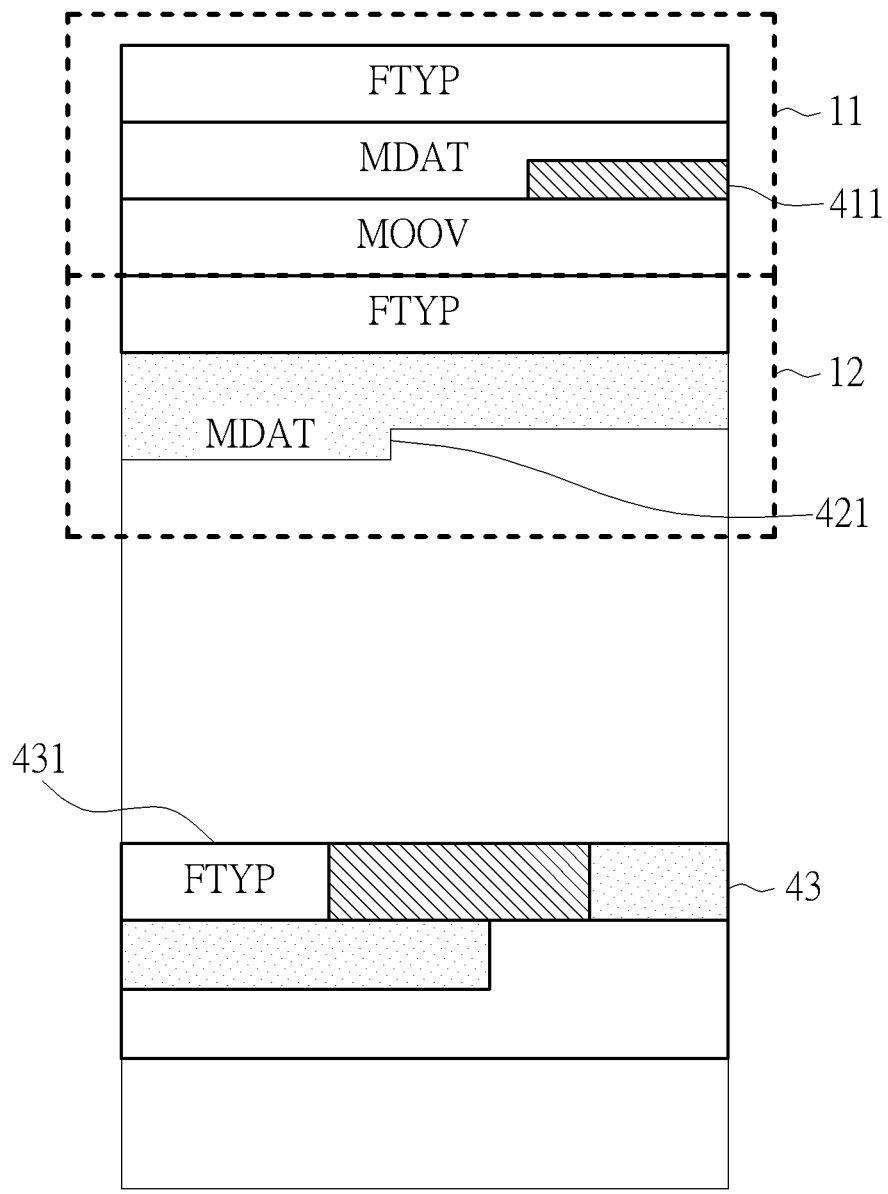
FIG. 4 is a schematic diagram of allocation of the storage device when a conventional method activating emergency recording.
Figure 5:
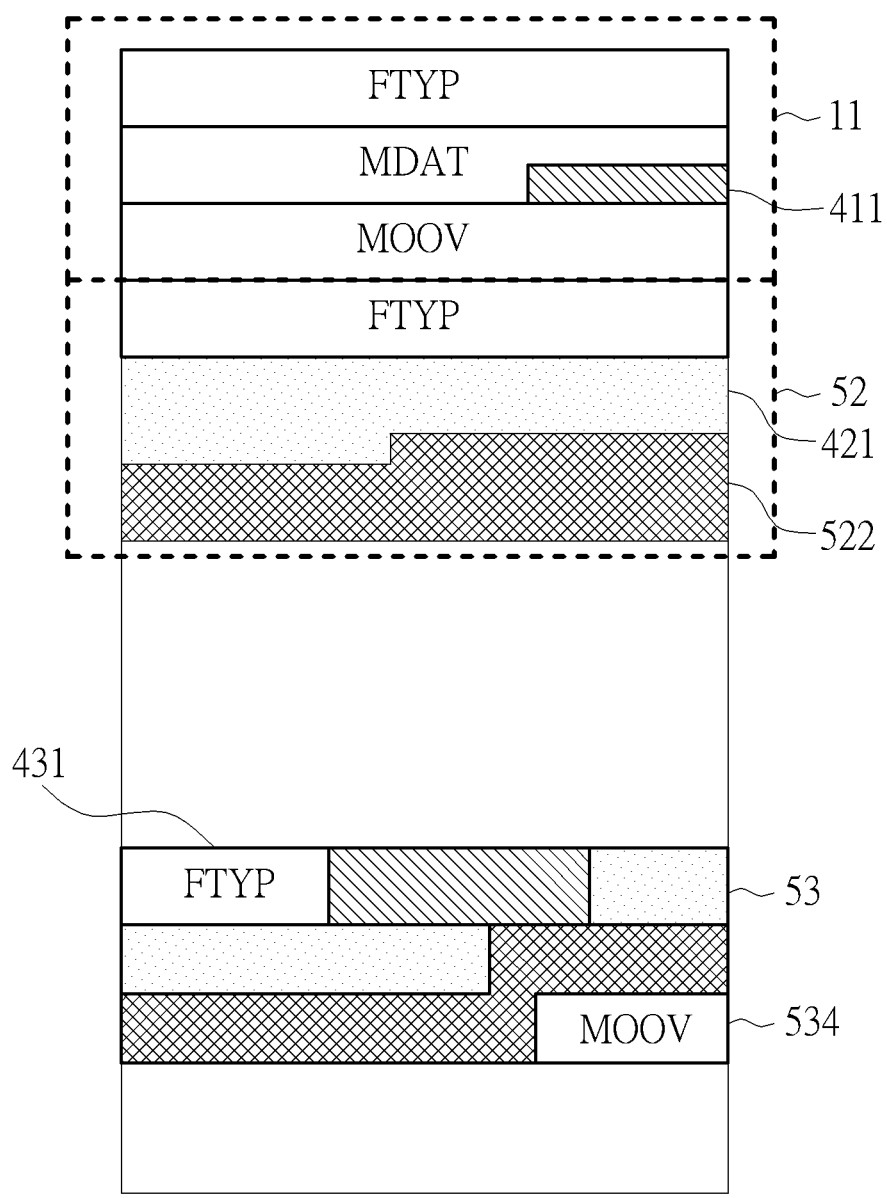
FIG. 5 is a schematic diagram of allocation of the storage device after the conventional method of FIG. 4 completes emergency recording.

Please refer to FIG. 2 together, as shown in FIG. 2 and FIG. 6, take fragmented storage structure for example, the metadata 631 and the media content 632 of the media file 63 are respectively corresponding to the index information (i.e. MOOF) 22 and the content information (i.e. MDAT) 23 of each fragment, wherein the metadata 22 mainly comprises movie fragment header (MFHD) 211 and multiple track fragment (i.e. TRAF) 212 of a media file, wherein the MFHD 211 comprises the sequence number of each fragment, and the TRAF 212 describes specific information of each image track. Each TRAF 212 comprises a track fragment header (i.e. TFHD) 2121 and a TRUN 2122. The TFHD 2121 comprises base data offset information for denoting explicit anchor for the data offsets in each track run of the media content 23 in the fragment, and the TRUN 2122 comprises data offset information, which is a relative offset value with a sign. For example, if the base data offset of the TFHD 2121 is 10000 and the data offset of the TRUN 2122 is −100, the track of the media content 23 in the fragment is at an address of 9900 in the file, wherein the media content 23 comprises a image data V and audio data A.

Nowadays, storage devices utilize sectors as physical access units. On the other hand, file system utilizes clusters as logical access units for storage devices. For example, a cluster of a FAT32 file system for an SD card can be set to have 64 sectors and a size of each sector is 512 bytes, such that a size of each cluster is 512*64 bytes, and an SD card with capacity of 4G has 131072 clusters. Storage space for loop recording is usually denoted by a cluster list in a file system. When the storage space is full, a processing device searches the earliest (oldest) written cluster in the cluster list and overwrites the cluster to achieve loop recording.

A normal recording devices has a bit rate control unit for media and thus can set smallest compression rate. The maximum bit rate of image data can be derived from (1) capturing frame rate (e.g. 30 frames per second); (2) definition of an (e.g. width=1280 and high=720); (3) smallest compression rate (e.g. 42) and (4) capturing format (e.g. YUV420) etc. Take the above parameter as example, maximum bit rate=(1280*720*30*12)/42 bits per second. In addition, the maximum bit rate of audio data compression can derived from audio compression format. For example, for a dual-track audio file with each sampling denoted by 16 bit and a sampling rate of 48K Hz in a PCM format, audio bit rate per second is 48000*16*2. Other media tracks can be estimated maximum bit rates thereof by the same manner. Finally, maximum bit rates of all media tracks are summed up to derive the maximum bit rate of the media content.

Figure 7:
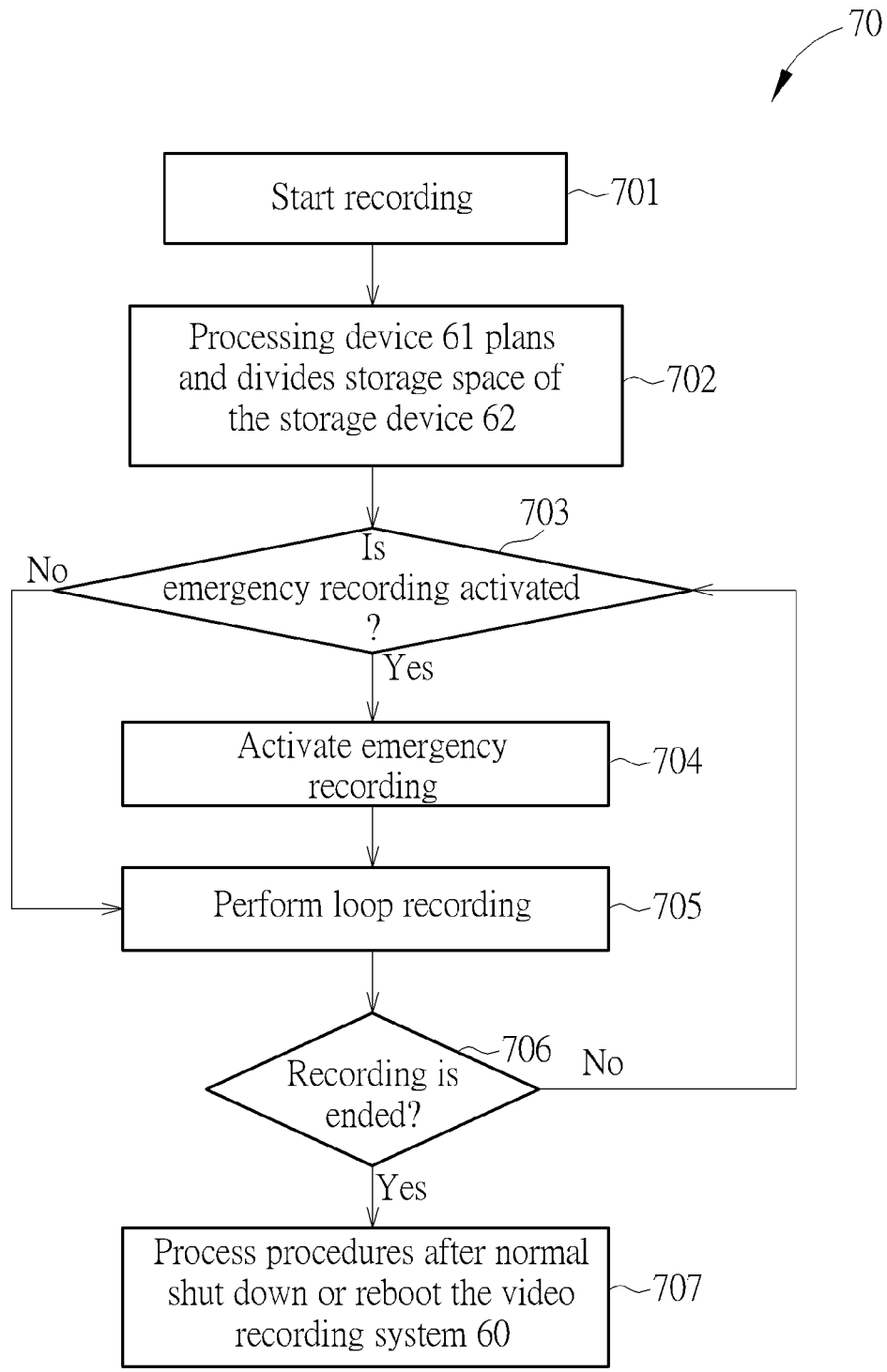
FIG. 7 is a schematic diagram of a recording process according to an embodiment of the present invention.
Figure 8:
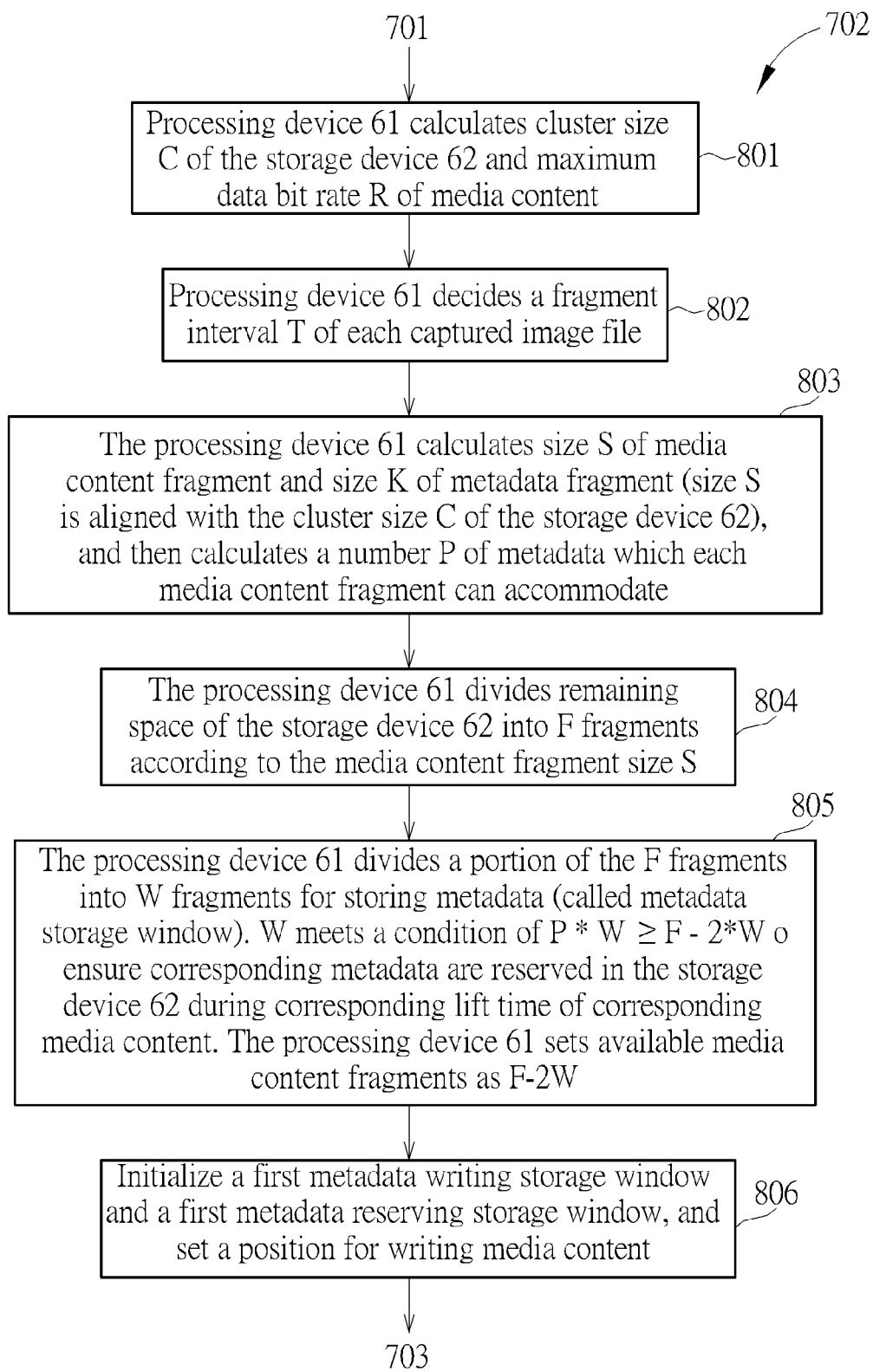
FIG. 8 is a flow chart of a processing device planning and dividing storage space of a storage device in a step of FIG. 7.

Please refer to FIG. 7 together. FIG. 7 is a schematic diagram of a recording process 70 according to an embodiment of the present invention. As shown in FIG. 7, after start recording in step 701, the processing device 61 plans and divides storage space of the storage device 62 in step 702. In detail, please refer to FIG. 8, which is a flow chart of the processing device 61 planning and dividing storage space of the storage device 62 in step 702 of FIG. 7. As shown in FIG. 8, in step 801, the processing device 61 calculates a cluster size C of the storage device 62 and a maximum data bit rate R of a media content, and then in step 802, the processing device 61 decides a fragment interval unit T of each captured image file. Then, in step 803, the processing device 61 derive maximum storage space S'=T*R required for media content 23 of each fragment from the maximum bit rate R and the fragment interval unit T of media content. Finally, the processing device 61 rounds up S' as an integral multiple of the cluster size C (i.e. aligned with the cluster size C of the storage device 62 for easy access) to derive a size $S = \lceil S'/C \rceil * C$ of aligned media content fragment ($\lceil X \rceil$ denotes rounding up X). The function of S is as a unit of the storage device and is called a fragment (i.e. each media content fragment). Intuitively, a fragment is storage space capable of safely storing media content of T interval units (e.g. seconds). The processing device 61 calculates a size K of a metadata fragment from metadata size required for each sampling of each track media content and sampling rate and fragment interval of each track media content. Finally, the processing device 61 calculates a number P=S/K of metadata which each media content fragment can accommodate.

In step 804, assume that capacity of the storage device 62 for recording is N clusters and the processing device 61 spends M clusters of the storage device 62 to store a file header FTYP and a metadata MOOV, the processing device 61 divides remaining space of the storage device 62 into F=(N−M)/S fragments according to the media content fragment size S. Intuitively, F represents that the storage device 62 can mostly store media content of F*T interval units after the fragment size S and the cluster size C are aligned (the storage device 62 can be divided into F fragments mostly and each fragment can safely store media content of T interval units).

Figure 9:
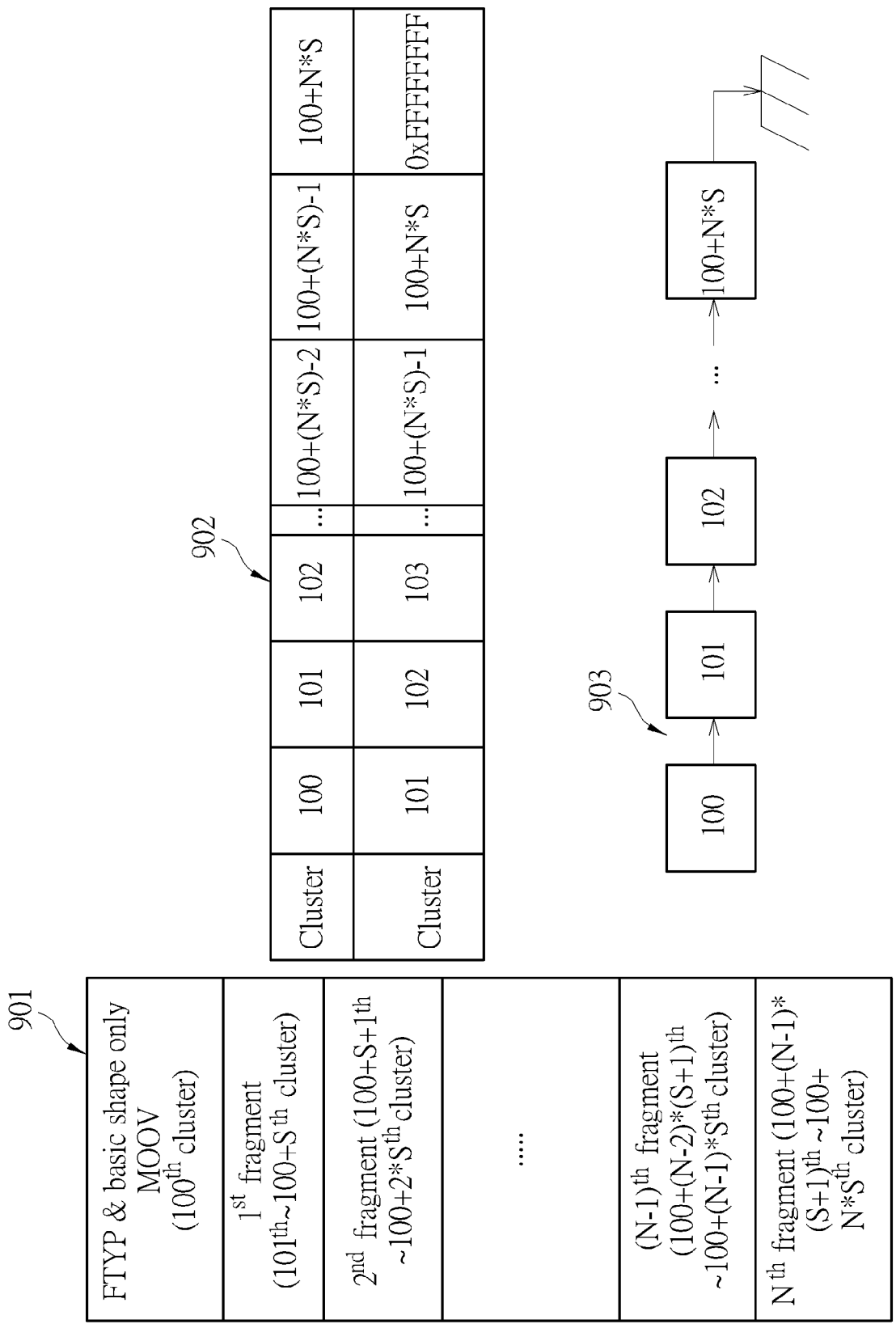
FIG. 9 is a schematic diagram of a link table of a file system.

Please refer to FIG. 9, which is a schematic diagram of a link table of a file system. As shown in FIG. 9, the processing device 61 divides the storage device 62 according to the above steps to derive a loop recording file allocation table 902 and an allocation schematic table 901. In this example, the storage device 62 is divided into N fragments and each fragment size is S clusters. The file system is built in FAT32 format. The loop recording file allocation table 902 of the file system specifies the number of next cluster for each cluster, the number of 0xFFFFFFFF represents the last cluster. In this example, the loop recording file has N*S+1 clusters and is allocated in continuous N*S+1 clusters from $100^{th}$ cluster of the storage device 62 (this is a simplified example, and cluster numbers can be reversed or discontinuous in practice). If a link table is utilized for representing the loop recording file allocation table 902, it can be represented by the arrangement of the link table 903 (i.e. sequentially reading from $100^{th}$ cluster 100+N*$S^{th}$ cluster).

Please refer to FIG. 8 and FIG. 9 together, in step 805, the processing device 61 divides the F fragments of remaining space into fragments for storing metadata and fragments for storing media content, wherein a number of fragments for storing metadata are W and called metadata storage window (which can further be divided into a metadata reserving storage window and a metadata writing storage window with respect to respective functions). W can be a smallest positive integer meeting a condition of $P*W \geq F-2*W$ (W is not limited to a smallest positive integer, but W is smaller for greater space utilization of the storage device 62), to ensure corresponding metadata are reserved in the storage device 62 during corresponding lift time of corresponding media content. Each metadata storage window can be set to store metadata of F−2W fragments at most. Intuitively, W is a number of fragments for at least safely storing metadata of (F−2*W)*T interval units of media content.

Take the fragment interval unit T as 1 second for example, a capacity of the storage device 62 is 4G bytes and an access unit of the file system is set to be a cluster size equal to 64*512 bytes, and thus there are N=131072 clusters, wherein a portion of clusters are reserved for storing the file system and other necessary information, a portion of clusters are utilized for storing FTYP and MOOV, and remaining 130958 clusters are utilized for recording. A bit rate of media content is 2221906 bytes per second (image definition 1080*720; 30 frames per second; smallest compression rate 42; each sampling 12 bit; audio bit rate 1536 bytes per second). Therefore, each fragment requires S=68 clusters ($=\lceil 2221906/(512*64) \rceil$), and the storage space is divided into F=1925=130958/68 fragments. Besides, metadata of all tracks of each fragment can be stored by one sector (512 bytes), and thus each fragment can store metadata of 64*68=4352 fragments. Finally, since W=1 is a smallest positive integer meeting a condition of $4352*W \geq 1925-2*W$, the metadata storage window size can be set to 1.

Figure 10:
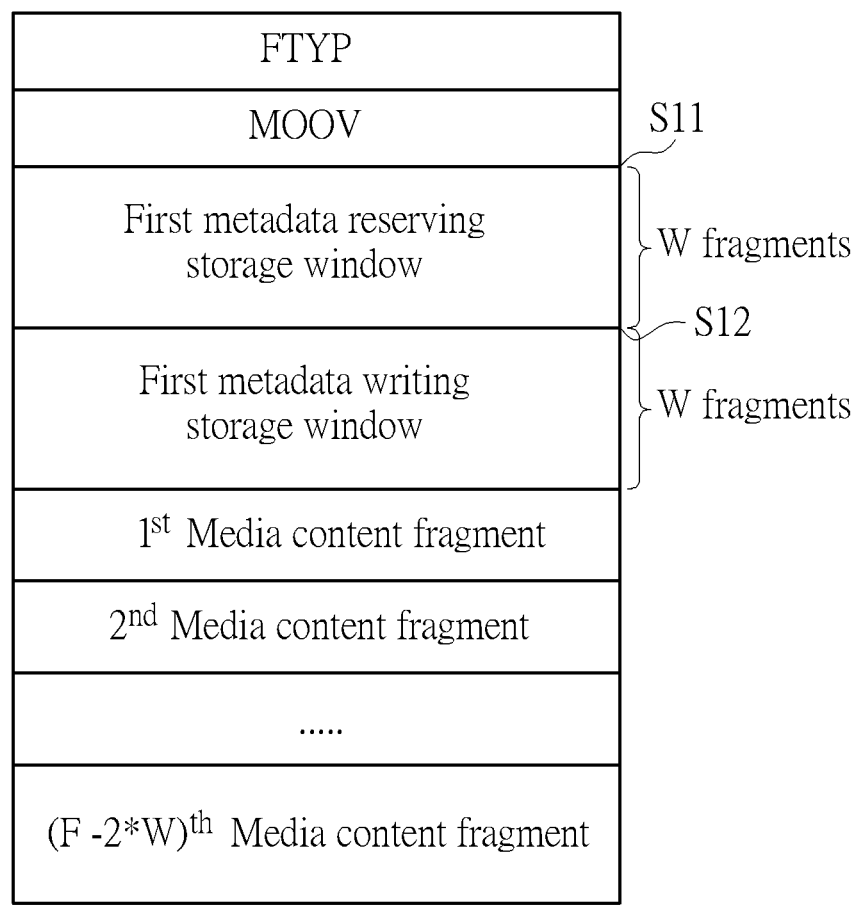
FIG. 10 is a schematic diagram of allocation of the storage device whenever the video recording system activates.

Please refer to FIG. 10, which is a schematic diagram of allocation of the storage device 62 whenever the video recording system 60 activates. As shown in FIG. 8 and FIG. 10, in step 806, when activating recording, a first metadata reserving storage window S11 is continuous W fragments at the start of the file, and a first metadata writing storage window S12 is continuous W fragments following the first metadata reserving storage window S11 and is set empty. As the same time, the video recording system 60 has two metadata storage windows S11, S12, and the new metadata writing storage window S12 stores indexes of recent media content, and the media content directed by indexes of the old metadata reserving storage window S11 is overwritten by loop recording gradually. The two simultaneously existing metadata storage windows S11, S12 can ensure: (1) corresponding metadata (index) of all media content is reserved in the video recording system 60; (2) metadata is arranged in sequence to comply with requirements of specification. Metadata is always written in the metadata writing storage window S12. The storage device 62 has F−2W fragments for storing media content outside of the space for the metadata storage windows S11, S12.

Figure 11:
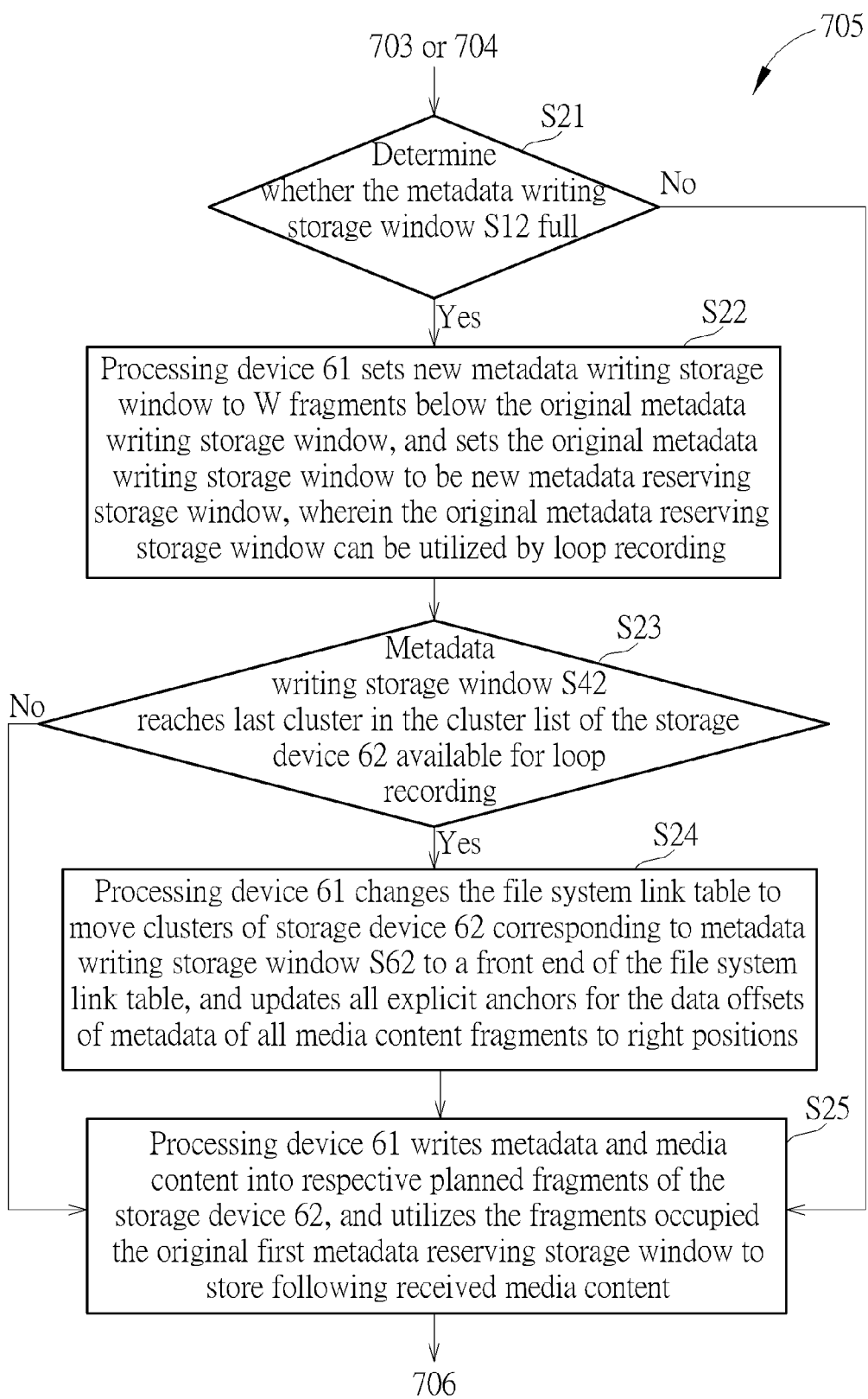
FIG. 11 is a flow chart of normal loop recording of a step shown in FIG. 7.

Please refer to FIG. 11 together. FIG. 11 is a flow chart of normal loop recording of step 705 shown in FIG. 7. As shown in FIG. 7, FIG. 10 and FIG. 11, when not activating emergency recording in step 703 and entering step 705 in normal loop recording to perform loop recording, the processing device 61 determines whether the first metadata writing storage window S12 is full in step S21. If the first metadata writing storage window S12 is not full, the storage device 62 sequentially receives the media content 632 and the metadata 631 transmitted by the processing device 61, and stores the metadata 631 in the first metadata writing storage window S12 and sequentially stores the media content 632 in each media content fragment. As a result, the processing device 61 can process the media content 632 audio and video files according to the metadata 631.

Figure 12:
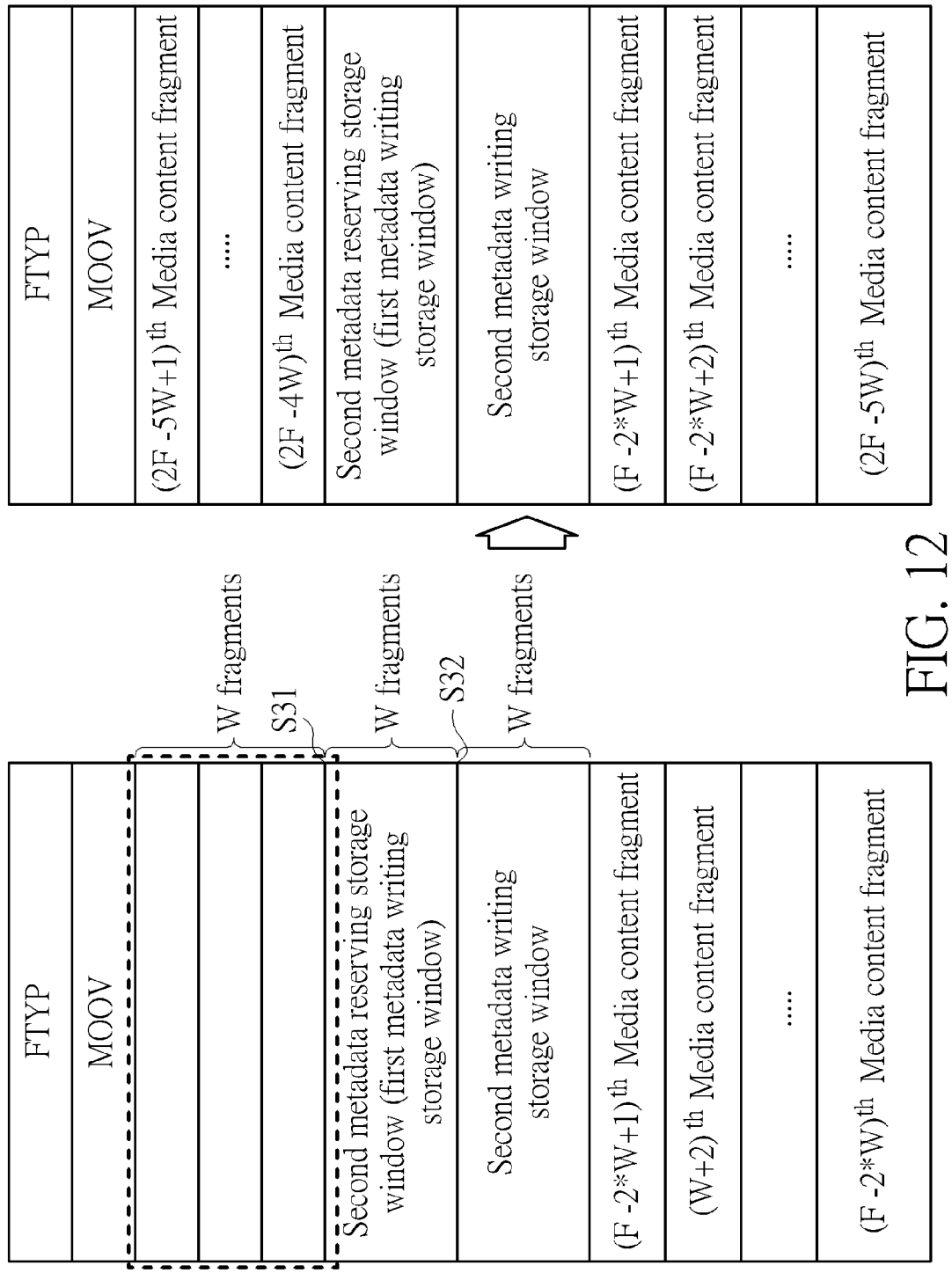
FIG. 12 is a schematic diagram of processing of the processing device when the storage device is full.

Then, please refer to FIG. 12 together. FIG. 12 is a schematic diagram of processing of the processing device 61 when the storage device 62 is full. As shown in FIG. 7, FIG. 11 and FIG. 12, if the first metadata writing storage window S12 is full, i.e. the storage device 62 reaches storage limit and F−2W media content fragments are full, and the video recording system 60 still performs loop recording, as shown in step S22 and the left side of FIG. 12, the processing device 61 performs following operations: (1) the original first metadata writing storage window S12 is set to be a new second metadata reserving storage window S31; (2) a new second metadata writing storage window S32 is moved to W fragments below the original first metadata writing storage window S12 to overwrite originally stored and oldest W fragments of media content; (3) new media content S34 is written from next fragment of the new second metadata writing storage window S32; (4) the fragment occupied by the original first metadata reserving storage window S11 will store following received media content; (5) perform next round of loop recording; in the new round of recording, recording fragments are from $(F-2W+1)^{th}$ fragment to $(2F-4\ W)^{th}$ fragment, and original $1^{st}$ fragment to $(F-2W)^{th}$ fragment are gradually overwritten.

During loop recording, index information stored in the original first metadata writing storage window S12 (i.e. the current second metadata reserving storage window S31) is still reserved. Since the second metadata reserving storage window S31 stores indexes of $1^{st}$ to $(F-2W)^{th}$ media content fragments and the second metadata writing storage window S32 stores indexes of $(F-2W+1)^{th}$ to $(2F-4\ W)^{th}$ media content fragments, corresponding metadata of all media content fragments in the video recording system 60 are fully reserved without lost, and all sequence numbers in MFHD of MOOF are arranged to increase progressively in addresses according to specification and thus the file is in a legal format. Finally, as shown in right side of FIG. 12, when a new round of loop recording ends, indexes of the second metadata reserving storage window S31 are expired and all indexes are stored in the second metadata writing storage window S32 and a limit of (F−2W) is reached. Step S22 is performed again.

Figure 13:
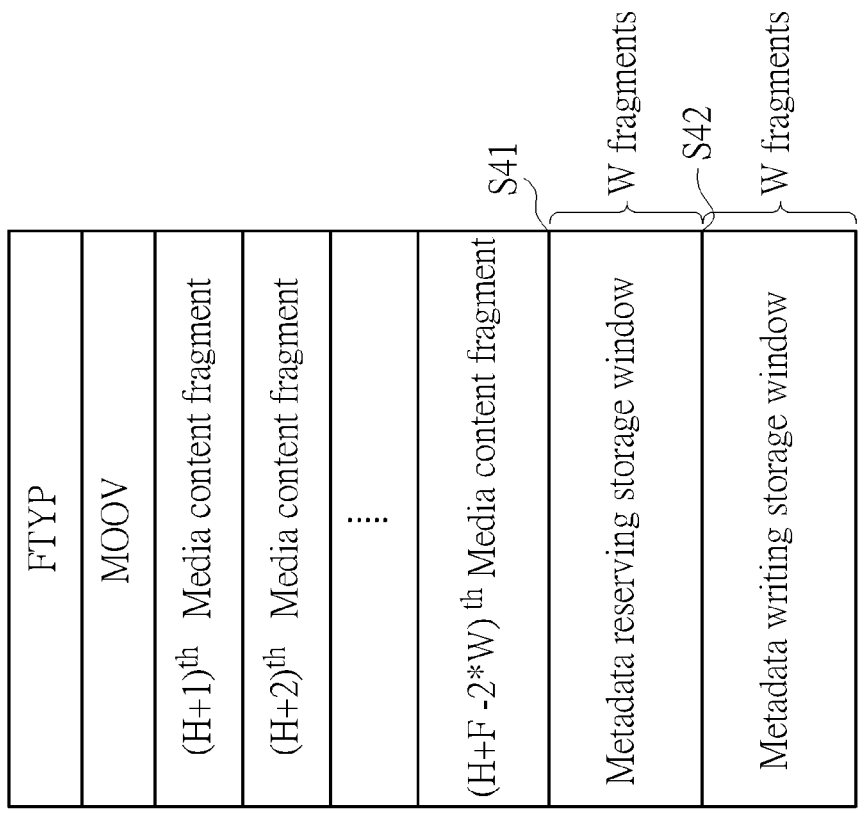
FIG. 13 is a schematic diagram of a metadata writing storage window reaching the bottom of the storage device.

Then, please refer to FIG. 13, which is a schematic diagram of the metadata writing storage window reaching the bottom of the storage device 62. As shown in FIG. 11 and FIG. 13, in step S23 of FIG. 11, the processing device 61 determines whether continuous loop recording makes a metadata writing storage window S42 to reach last cluster in the cluster list of the storage device 62 available for loop recording; if not, as step S25, the processing device 61 writes metadata and media content into respective planned fragments of the storage device 62 (e.g. the above second metadata writing storage window S32 and next fragment of the new second metadata writing storage window S32), and utilizes the fragments occupied the original first metadata reserving storage window to store following received media content.

On the other hand, if a situation of the metadata writing storage window S42 reaching last cluster in the cluster list of the storage device 62 available for loop recording is intended to be reached, since each fragment can accommodate metadata of 1923 fragments and there are 1925 fragments, and each fragment is image content of a second (i.e. interval unit), the video recording system 60 needs to perform loop recording continuously for 1923*1924 seconds to reach the situation. During this period, the video recording system 60 does not need to perform any file system operation (i.e. not performing step S24) to keep file complete, and thus this period is called safe recording period. Only if the safely recording period is expired, the video recording system 60 needs to perform operations of file link table to keep all sequence numbers in MFHD of MOOF are arranged to increase progressively in addresses according to specification. In this example, the safely recording period is about 43 days. Since capacity of most current storage devices are greater than 4G, the embodiment can meet requirements of most monitoring devices. As a result, the processing device 61 writes metadata in another metadata writing storage window which is different fragments from fragments of corresponding media content, and whenever the storage device 62 reaches the storage limit and loop recording is performed, the processing device 61 converts the original metadata writing storage window into the metadata reserving storage window for reserving metadata and writes metadata into the new metadata writing storage window to continue writing metadata. Therefore, it can record for a very long period until file system operations are performed, so as to avoid completeness of the file being damaged by power cut or equipment damage during file system operations (as stated in following description, the processing device 61 performs file system operations to recover to an initial state after the video recording system 60 ends recording, and thus it takes continuous long recording until file system operations are performed during recording, which is practically impossible to happen).

Figure 14:
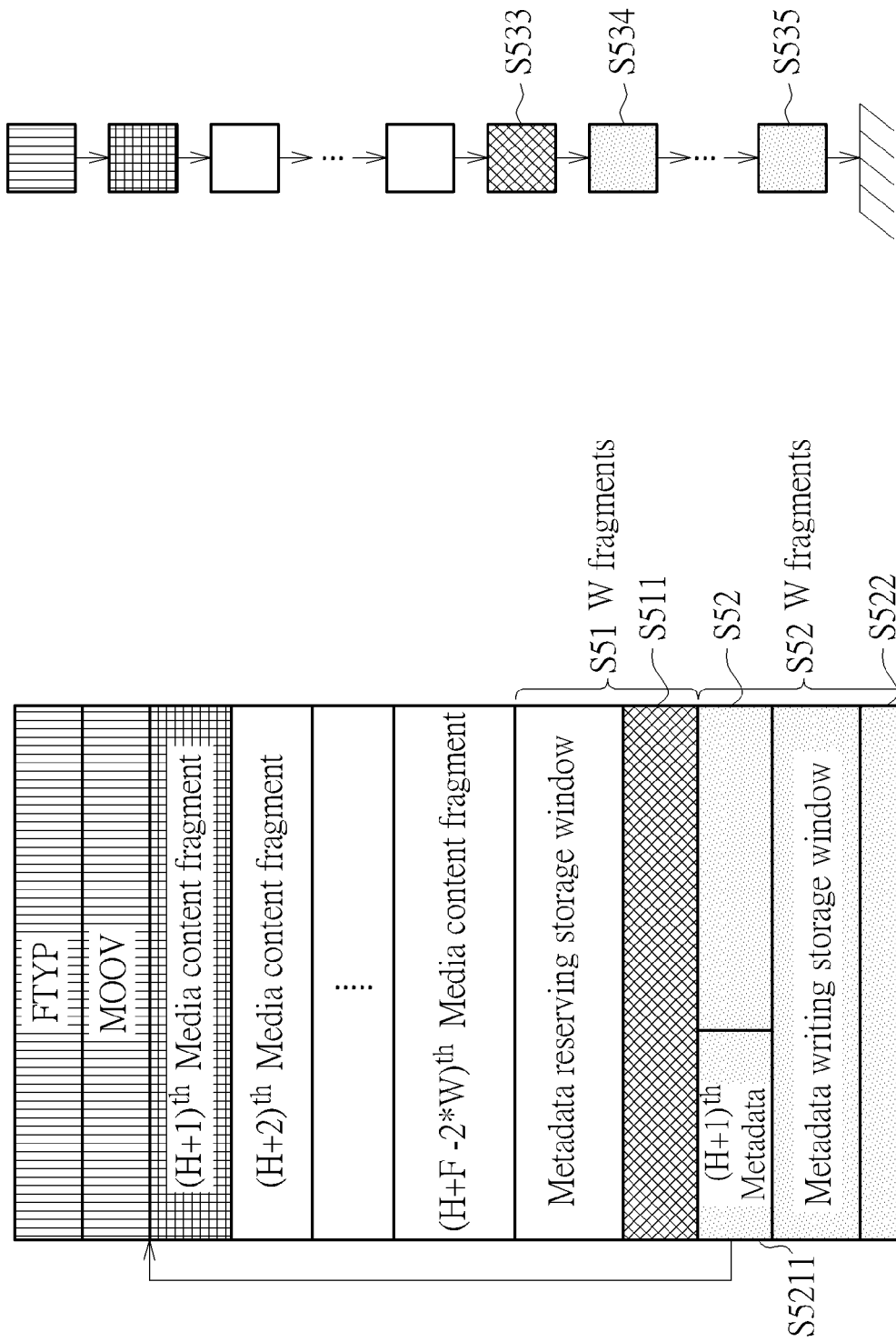
FIG. 14 is a schematic diagram of a corresponding file system link table when the metadata writing storage window reaches the bottom of the storage device 62.
Figure 15:
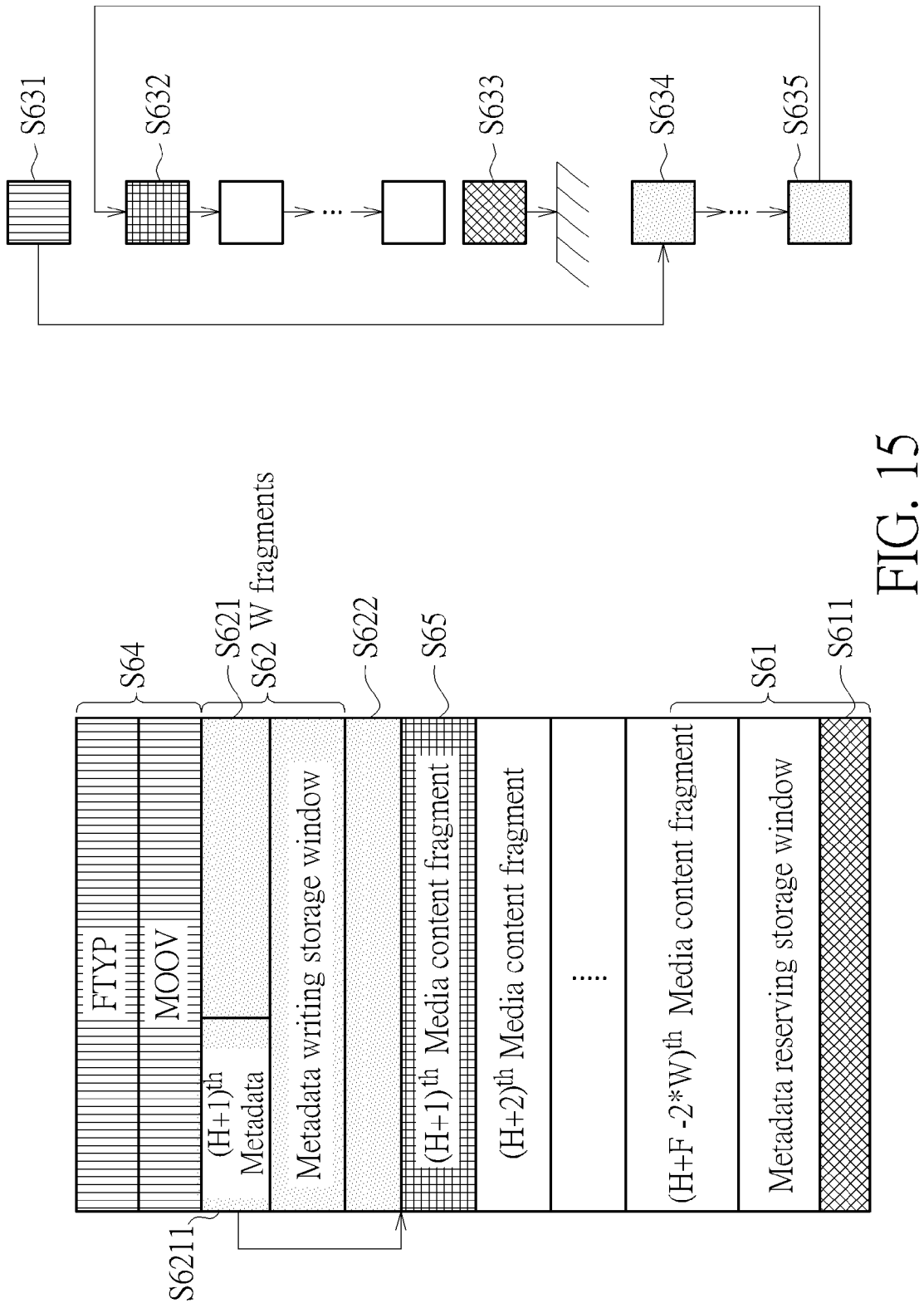
FIG. 15 is a schematic diagram of changing a file system link table to move the metadata writing storage window as shown in FIG. 14.

Then, please refer together FIG. 14 and FIG. 15. FIG. 14 is a schematic diagram of a corresponding file system link table when the metadata writing storage window reaches the bottom of the storage device 62, and FIG. 15 is a schematic diagram of changing the file system link table to move the metadata writing storage window as shown in FIG. 14. As shown in FIG. 11, FIG. 14 and FIG. 15, when the metadata writing storage window S42 reaches last cluster in the cluster list of the storage device 62 available for loop recording and step S24 is performed, an FAT32 file system is taken as an example for illustrating how to operate the file system link table to change relative positions of file content cluster. The objective is to keep all sequence numbers in MFHD of MOOF are arranged to increase progressively in addresses according to specification, and other type file systems can be applied with the same corresponding methods. A fragment is a unit in this schematic link diagram. Although a fragment practically includes multiple clusters, a fragment is a unit for simplification without loss of generality.

As shown in FIG. 14, next cluster of a last cluster S511 of an original metadata reserving storage window S51 (corresponding to a cluster S533 in the link table) is a first cluster S521 of a metadata writing storage window S52 (corresponding to a cluster S534 link table) in the file system link table. Next cluster of a last cluster S522 of the metadata writing storage window S52 (corresponding to a cluster S535 of the link table) points to 0xFFFFFFFF representing the bottom of the file. As step S24 of FIG. 11 performs operations of FIG. 15, the processing device 61 changes the file system link table such that next cluster of a last cluster S611 of an original metadata reserving storage window (corresponding to a cluster S633 of the link table) points to 0xFFFFFFFF representing the bottom of the file in the link table of the file system. The processing device 61 changes next cluster of a file header cluster S64 (corresponding to a cluster S631 of the link table) to point to a first cluster S621 of a metadata writing storage window S62 (corresponding to a cluster S634 of the link table) of the link table of the file system. The processing device 61 changes next cluster of a last cluster S622 of the metadata writing storage window S62 (corresponding to a cluster S635 of the link table) to point to an original first data cluster S65 (corresponding to a cluster S632 of the link table). Finally, the processing device 61 updates all explicit anchors for the data offsets corresponding to TFHD of metadata track of the metadata writing storage window S62. Since the metadata writing storage window S62 is inserted before $H+1^{th}$ media content fragment, the original explicit anchor for the data offset comprised by $H+1^{th}$ metadata of data S5211 as shown in FIG. 14 is adjusted as data S6211 as shown in FIG. 15. After completing updating position of the metadata writing storage window S62 and all explicit anchors for the data offsets, following normal operations can be performed as shown in step S22 of FIG. 11. As a result, data is actually stored in the same position of the storage device 62 as shown in FIG. 14 and FIG. 15 (each cluster of the link table denotes actual storage position of data), the cluster S634 of the link table can be accessed first by changing links of clusters, to equivalently reach the reading sequence as shown in the left side of FIG. 15. Then, the above operations are repeated to increase sequence numbers progressively according to specification.

Figure 16:
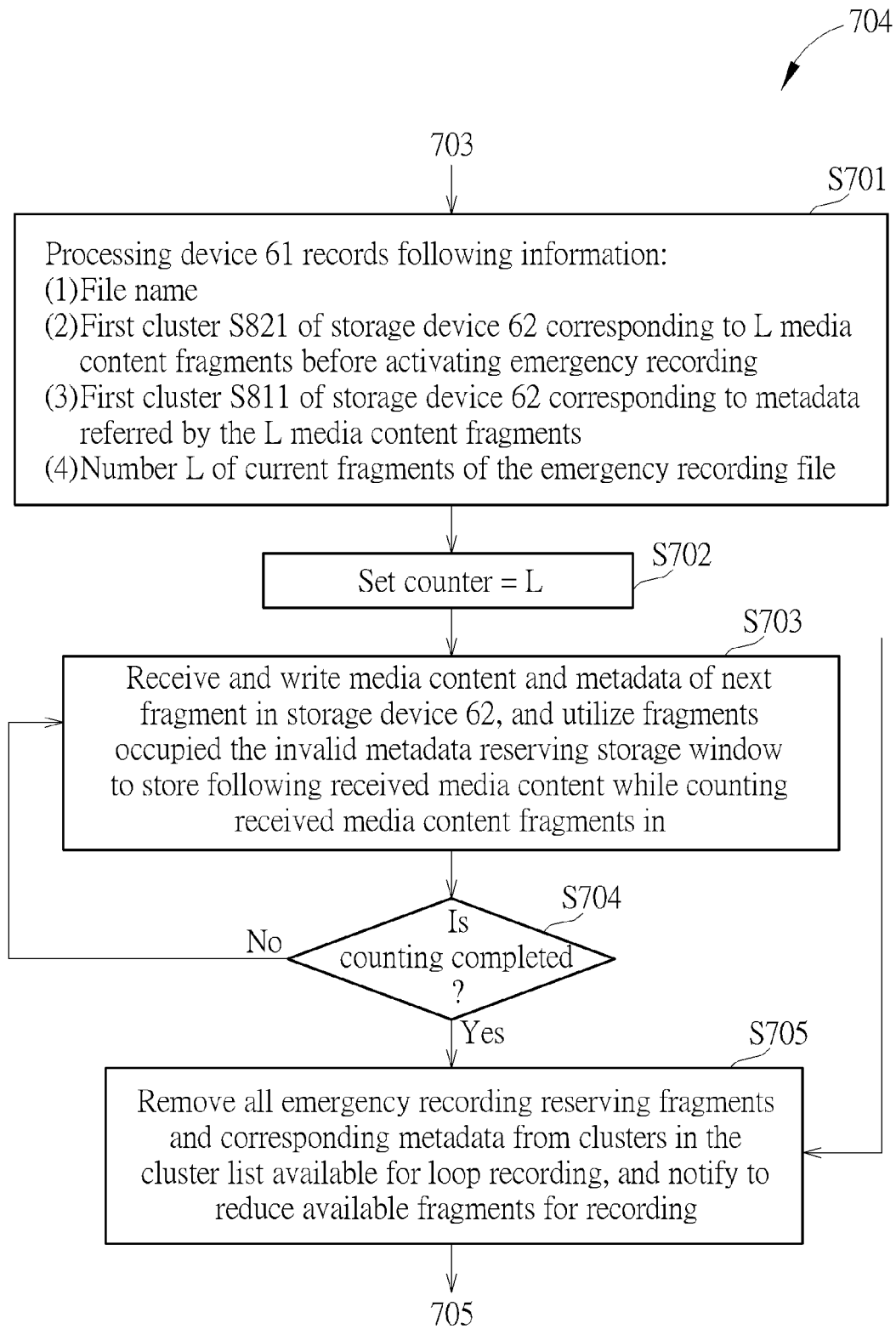
FIG. 16 is a flow chart of activating emergency recording as shown in a step of FIG. 7.
Figure 17:
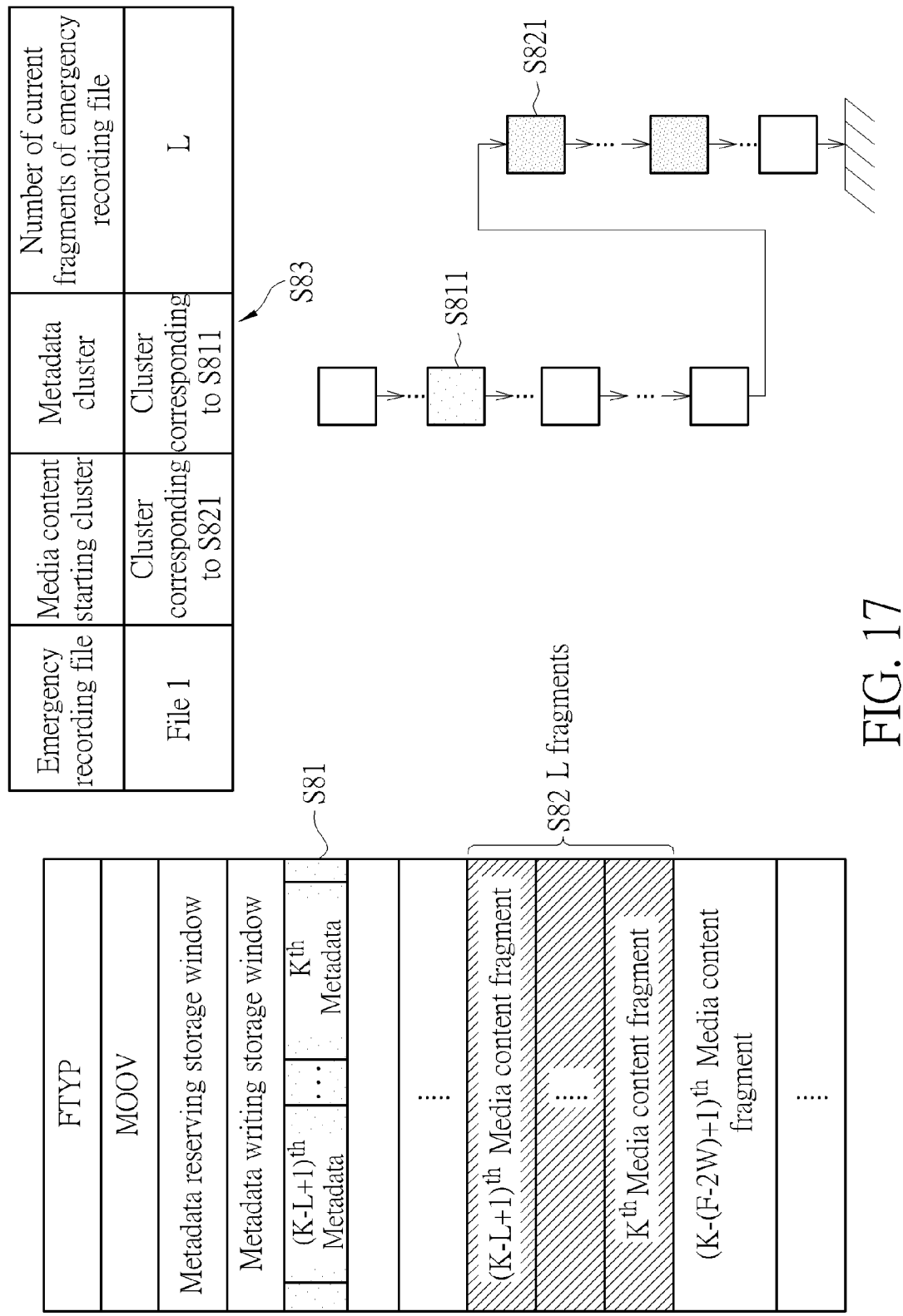
FIG. 17 is a schematic diagram of an example and a corresponding emergency recording list file when an emergency recording event is triggered.
Figure 18:
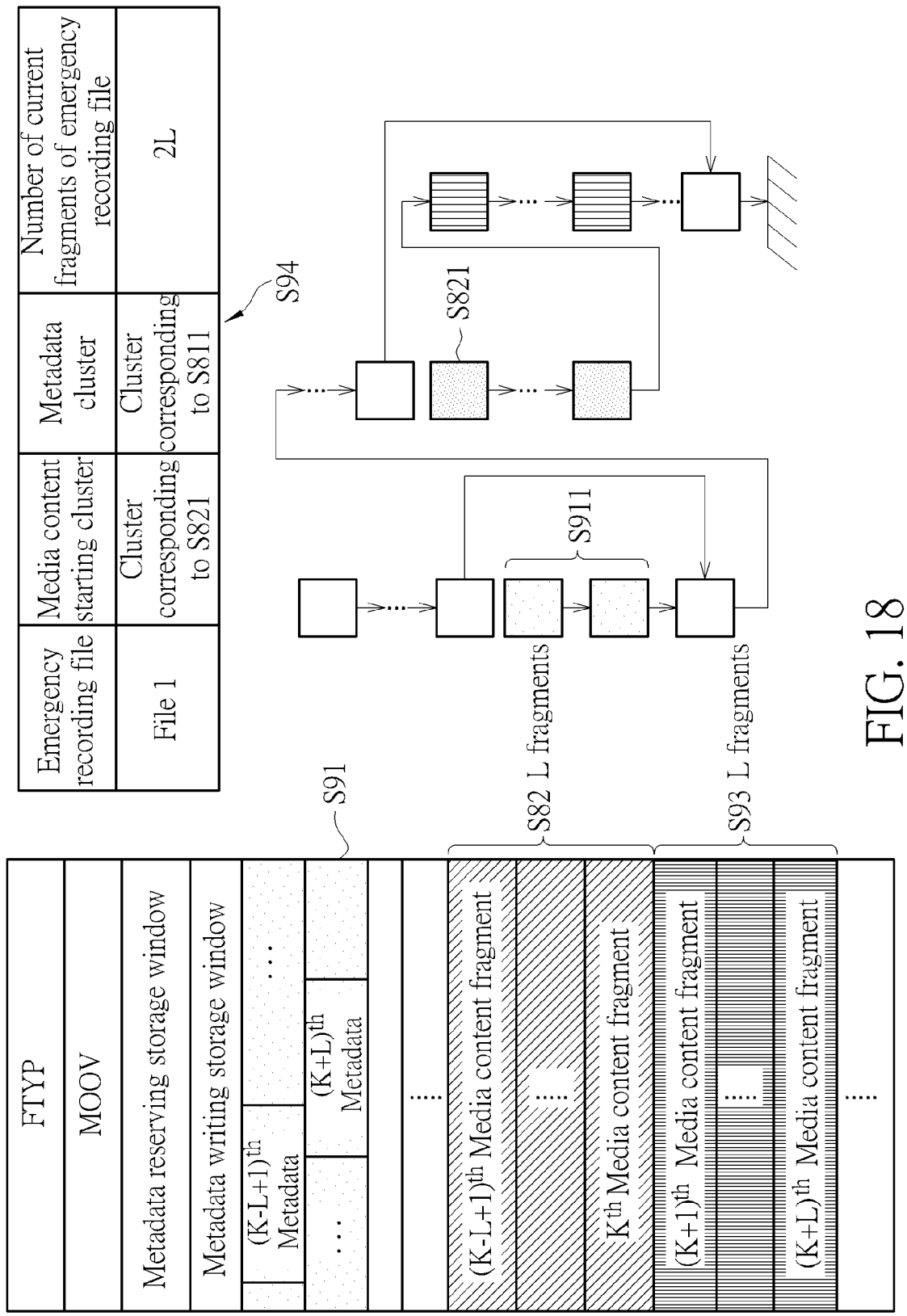
FIG. 18 is a schematic diagram of an example following the emergency recording event triggered in FIG. 17 and a file link table and an emergency recording list file after the emergency recording event is completed.

On the other hand, please refer to FIG. 16, FIG. 17 and FIG. 18. FIG. 16 is a flow chart of activating emergency recording as shown in step 704 of FIG. 7, FIG. 17 is a schematic diagram of an example and a corresponding emergency recording list file when an emergency recording event is triggered, and FIG. 18 is a schematic diagram of an example following the emergency recording event triggered in FIG. 17 and a file link table and an emergency recording list file after the emergency recording event is completed. As shown in FIG. 7, when determining emergency recording is activated in step 703 and activating emergency recording in step 704, the processing device 61 requests to reserve each L fragments before and after the emergency recording event is triggered (i.e. reserving and locking media content of each L*T interval units before and after triggering as at least one emergency media content, to process the at least one emergency media content as an emergency recording file according to at least one emergency metadata corresponding to the at least one emergency media content). Under such a situation, as shown in FIG. 16 and FIG. 17, in step S701, the processing device 61 records related information of the emergency recording event in a table S83 shown in FIG. 17, the table S83 comprises a first cluster S821 of the storage device 62 corresponding to L media content fragments before activating emergency recording (i.e. a cluster S82); a first cluster S811 of the storage device 62 corresponding to metadata referred by the L media content fragments (i.e. a cluster S81) and a number L of current fragments of the emergency recording file. Then, the processing device 61 sets a counter=L in step S702, and continues the above operations to receive and write media content and metadata of next fragment in the storage device 62, and utilizes the fragments occupied the invalid metadata reserving storage window to store following received media content while counting received media content fragments in step S703. Finally, as shown in FIG. 17 and FIG. 18, when determining counting is completed in step S704, the processing device 61 removes all emergency recording reserving fragments (such as clusters S82, S93) and corresponding metadata (such as clusters S91 and corresponding clusters S911) from clusters in the cluster list available for loop recording (i.e. reserving and locking at least one media content before and after triggering emergency recording as the at least one emergency media content), and notifies to reduce available fragments for recording in step S705 (as shown in a link table of FIG. 18, in the following loop recording, the reserved emergency recording fragments and clusters of corresponding metadata are no longer linked with other clusters, i.e. when storing following media contents after triggering emergency recording, locking and not overwriting the at least one emergency media content and the at least one emergency metadata). Emergency recording from steps S701 to S705 only involve recording necessary information of the emergency recording file and notifying the video recording system 60 not to utilize clusters of the storage device 62 owned by the emergency recording file during loop recording, to avoid the burden of moving a lot of data while simultaneously performing recording and simplify original complex operating processes.

Figure 19:
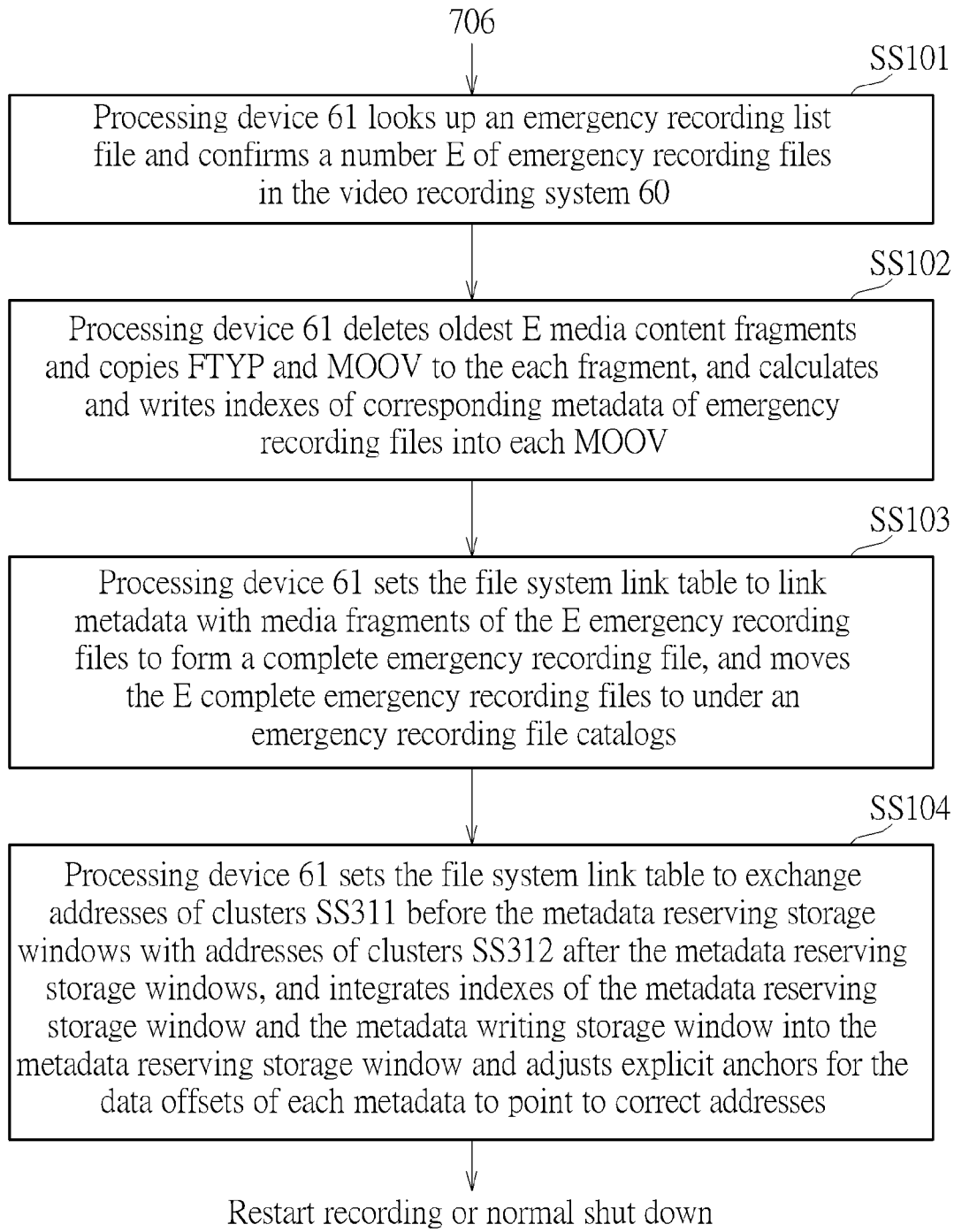
FIG. 19 is a flow chart of processing procedures after normal shut down or rebooting the video recording system in a step of FIG.
Figure 20:
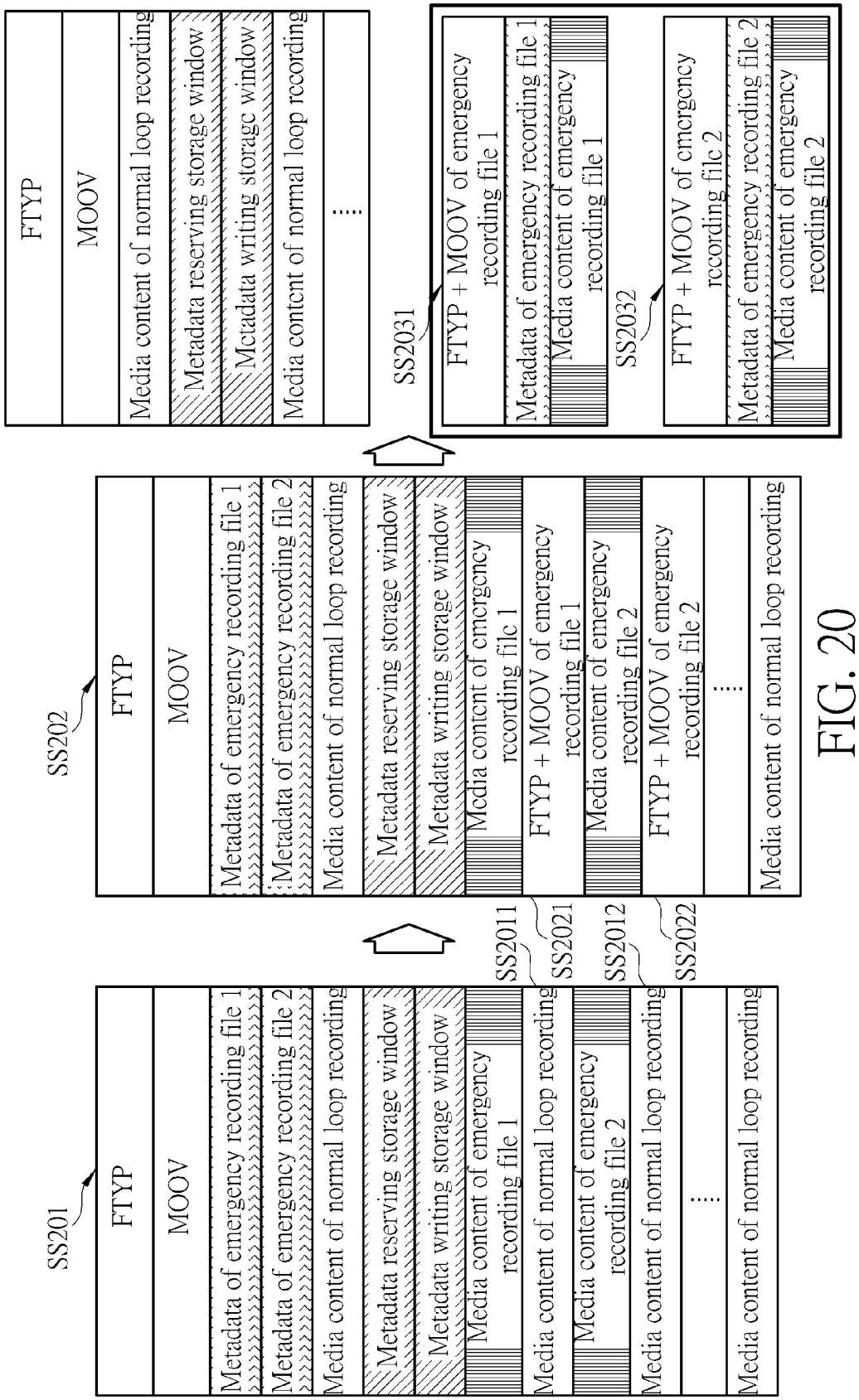
FIG. 20 is a schematic diagram of editing an emergency recording file to an emergency recording data folder.

Then, as shown in FIG. 7, the processing device 61 determines whether recording is ended in step 706, after determining recording is ended, procedures processed after normal shut down or the video recording system 60 is rebooted in step 707 after abnormal event occurs (i.e. the reason why the video recording system 60 is standby or shut down and recording is ended). In detail, please refer to FIG. 19 and FIG. 20. FIG. 19 is a flowchart of processing procedures after normal shut down or rebooting the video recording system 60 in the step 707 of FIG. 7, and FIG. 20 is a schematic diagram of editing emergency recording files to an emergency recording data folder. As shown in FIG. 19 and FIG. 20, when the video recording system 60 stops normal recording (e.g. an event data recorder is turned off when a car normally stops), an extending recording process is performed. At this moment, since recording operations consuming most system resource is stopped, the video recording system 60 can use most resource into performing converting operations of the extending recording process and back up file system before converting operations to ensure maximum safely. In such a situation, as in step SS101, the processing device 61 looks up the emergency recording list file and confirms a number E of emergency recording files in the video recording system 60, and then as in step SS102 and as shown in schematic allocation tables SS201, SS202, the processing device 61 deletes oldest E media content fragments (e.g. media content fragments SS2011, SS2012) and copies FTYP and MOOV to the each fragment (e.g. forming fragment SS2021, SS2022), and calculates and writes indexes of corresponding metadata of emergency recording files into each MOOV. Then, as in step SS103 and as shown in allocation schematic tables of SS2031, SS2032, the processing device 61 sets the file system link table to link metadata with media fragments of the E emergency recording files to form a complete emergency recording file (i.e. processing the at least one emergency media content into an emergency recording file according to at least one emergency metadata corresponding to the at least one emergency media content), Finally, the E complete emergency recording files are moved to under an emergency recording file catalogs (the schematic allocation table for normal loop recording no longer includes emergency recording files, i.e. storing the emergency recording files to the storage device 62 and the emergency recording file are not overwritten when storing following media contents).

Figure 21:
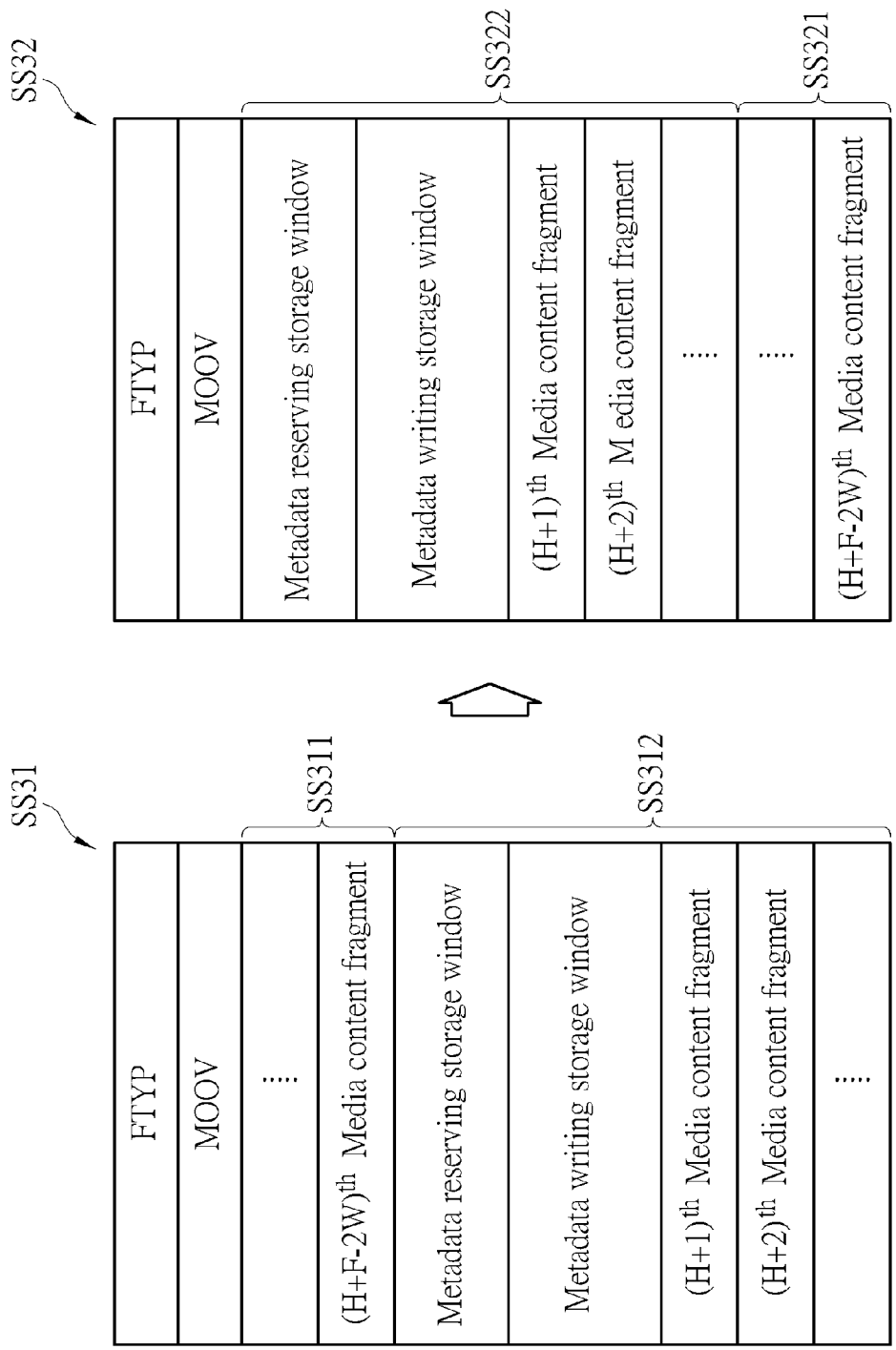
FIG. 21 is a schematic diagram of adjusting metadata storage windows to make the video recording system to return to an initial state.

Finally, please refer to FIG. 21, which is a schematic diagram of adjusting metadata storage windows to make the video recording system 60 to return to an initial state. As shown in FIG. 19 and FIG. 21, in step SS104, the processing device 61 sets the file system link table to exchange addresses of clusters SS311 before the metadata reserving storage windows with addresses of clusters SS312 after the metadata reserving storage windows in a schematic allocation table SS31, to form clusters SS322 and clusters SS321 of a schematic allocation table SS32 after completed. Then, indexes of the metadata reserving storage window and the metadata writing storage window are integrated into the metadata reserving storage window and explicit anchors for the data offsets of each metadata are adjusted to point to correct addresses, and the metadata writing storage window is empty after completed. As a result, the schematic allocation table SS33 can be corresponding to the allocation schematic table whenever initially activated as shown in FIG. 10. The video recording system 60 has completed reallocation of the storage device 62 for next activation after step 707.

Noticeably, if the reason why recording is ended is abnormality occurs, such that storing of media content and corresponding metadata is interrupted, the processing device 61 processes stored media content into an interrupted audio and video file according to stored metadata. Besides, the processing device 61 can comprise a processor (e.g. a microprocessor or an application-specific integrated circuit, ASIC) and a memory. The memory can be any data storage device, for storing a program, and the processor can read and perform the program. For example, the memory can be subscriber identity module (SIM), read-only memory (ROM), random-access memory (RAM), CD-ROM/DVD-ROM, magnetic tape, hard disk and optical data storage device etc.

Figure 22:
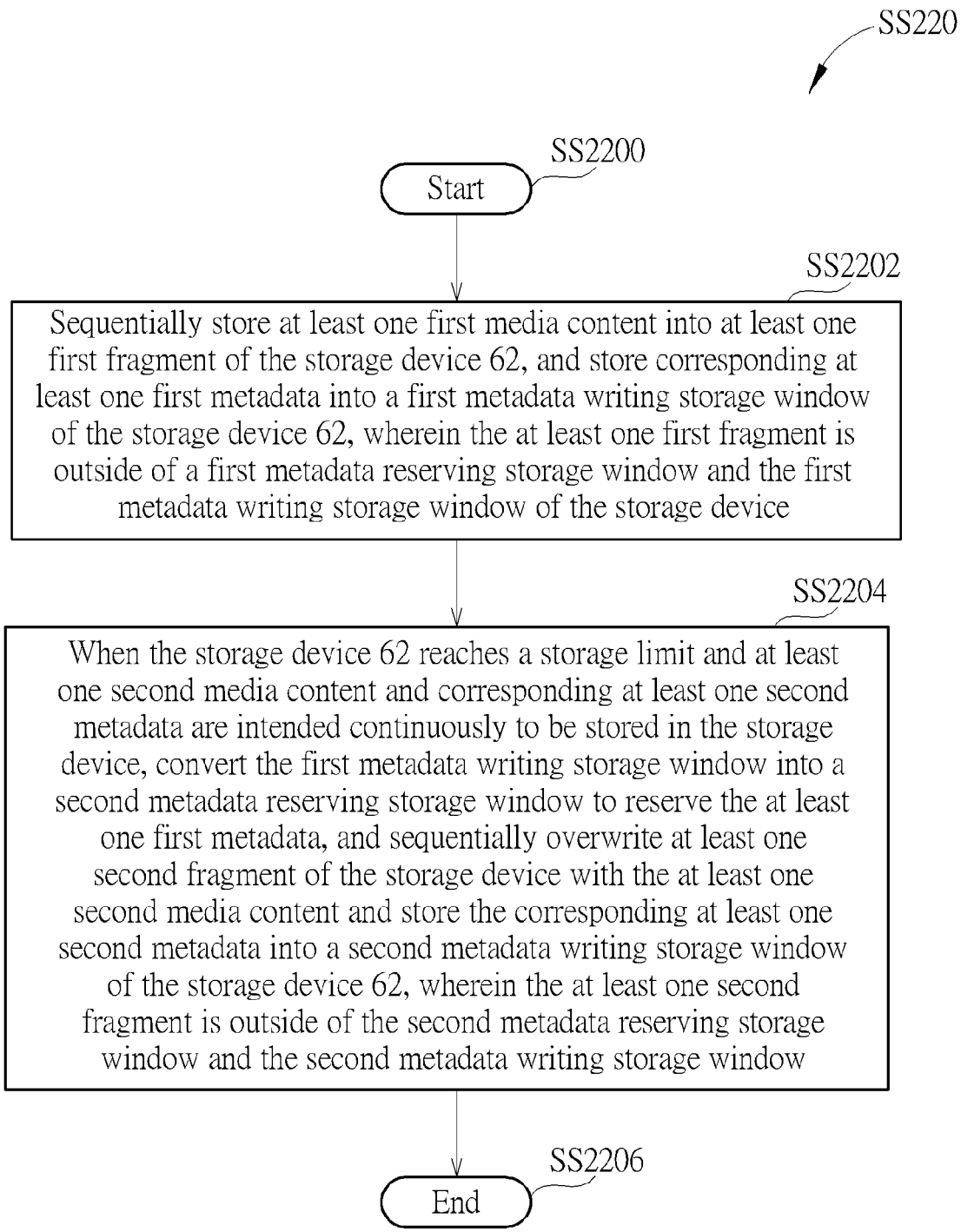
FIG. 22 is a schematic diagram of a storing process according to an embodiment of the present invention.

To sum up, storing operations of the video recording system 60 can be summarized into is a storing process SS220 as shown in FIG. 22. The video recording system 60 comprises following steps:

Step SS2200: Start.

Step SS2202: Sequentially store at least one first media content into at least one first fragment of the storage device 62, and store corresponding at least one first metadata into a first metadata writing storage window of the storage device 62, wherein the at least one first fragment is outside of a first metadata reserving storage window and the first metadata writing storage window of the storage device Step SS2204: When the storage device 62 reaches a storage limit and at least one second media content and corresponding at least one second metadata are intended continuously to be stored in the storage device, convert the first metadata writing storage window into a second metadata reserving storage window to reserve the at least one first metadata, and sequentially overwrite at least one second fragment of the storage device with the at least one second media content and store the corresponding at least one second metadata into a second metadata writing storage window of the storage device 62, wherein the at least one second fragment is outside of the second metadata reserving storage window and the second metadata writing storage window Step SS2206: End.

Detailed operations of the storing process SS220 can be referred to the above description, and are not narrated hereinafter.

In the prior art, file system operations are frequently applied to avoid a reversed sequence, but if power cut or equipment damage occurs during the file system operations, completeness of the file is damaged. Besides, steps of the conventional emergency recording are complex, and perform file editing procedures of the emergency recording mechanism while performing recording simultaneously. Under a situation of performing high definition recording or a SD card with a slow storing speed, it is a big challenge to system performance. It is very likely that the captured media data lose some frames when the system performance is not enough.

In comparison, the processing device 61 writes metadata in another metadata writing storage window which is different fragments from fragments of corresponding media content, and whenever the storage device 62 reaches the storage limit and loop recording is performed, the processing device 61 converts the original metadata writing storage window into the metadata reserving storage window for reserving metadata and writes metadata into the new metadata writing storage window to continue writing metadata. Therefore, it can record for a very long period until file system operations are performed, so as to avoid completeness of the file being damaged by power cut or equipment damage during file system operations. Besides, the emergency recording of the embodiment only involve recording necessary information of the emergency recording file and notifying the video recording system 60 not to utilize clusters of the storage device 62 owned by the emergency recording file during loop recording, to avoid the burden of moving a lot of data while simultaneously performing recording and simplify original complex operating processes.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A storing method, for storing data in a storage device of a video recording system, the storing method comprising:
    sequentially storing at least one first media content into at least one first fragment of the storage device, and storing corresponding at least one first metadata into a first metadata writing storage window of the storage device, wherein the at least one first fragment is outside of a first metadata reserving storage window and the first metadata writing storage window of the storage device; and
    when the storage device reaches a storage limit and at least one second media content and corresponding at least one second metadata are intended continuously to be stored in the storage device, converting the first metadata writing storage window into a second metadata reserving storage window to reserve the at least one first metadata, and sequentially overwriting at least one second fragment of the storage device with the at least one second media content and storing the corresponding at least one second metadata into a second metadata writing storage window of the storage device, wherein the at least one second fragment is outside of the second metadata reserving storage window and the second metadata writing storage window;
    wherein the first metadata writing storage window follows the first metadata reserving storage window, and the second metadata writing storage window follows the second metadata reserving storage window.

2. The storing method of claim 1, wherein the step of sequentially storing the at least one first media content into the at least one first fragment of the storage device, and storing the corresponding at least one first metadata into the first metadata writing storage window of the storage device further comprises:
    processing the at least one first media content into a first audio and video file according to the at least one first metadata.

3. The storing method of claim 1, wherein the step of sequentially storing the at least one first media content into the at least one first fragment of the storage device, and storing the corresponding at least one first metadata into the first metadata writing storage window of the storage device further comprises:
    when storing the at least one first media content and the corresponding at least one first metadata is interrupted, processing stored media content of the at least one first media content into an interrupted audio and video file according to stored metadata of the at least one first metadata.

4. The storing method of claim 1 further comprising:
    calculating a cluster and a data bit rate of the storage device.

5. The storing method of claim 4, wherein the step of calculating the cluster and the data bit rate of the storage device comprises:
    deciding a size of each fragment of the storage device corresponding to each media content; and
    deciding a divided capacity of the storage device and calculating a capacity of the storage device for storing metadata according to the size of the each fragment.

6. The storing method of claim 5, wherein the step of deciding the divided capacity of the storage device and calculating the capacity of the storage device for storing metadata according to the size of the each fragment comprises:
    deciding at least one metadata fragment of the storage device as the first metadata writing storage window, and calculating a number of metadata which the first metadata writing storage window stores mostly.

7. The storing method of claim 1 further comprising:
    when triggering an emergency recording, reserving and locking at least one media content before and after triggering the emergency recording as at least one emergency media content, and processing the at least one emergency media content into an emergency recording file according to at least one emergency metadata corresponding to the at least one emergency media content.

8. The storing method of claim 7 further comprising:
    when storing following media content after triggering the emergency recording, locking and not overwriting the at least one emergency media content and the at least one emergency metadata.

9. The storing method of claim 7 further comprising:
    storing the emergency recording file to the storage device, and not overwriting the emergency recording file when storing following media content.

10. The storing method of claim 1, wherein the step of sequentially storing the at least one first media content into the at least one first fragment of the storage device, and storing the corresponding at least one first metadata into the first metadata writing storage window of the storage device further comprises:
    when performing storing in an initial state, maintaining the first metadata writing storage window in a top position of a plurality of fragments of the storage device a, and sequentially storing the at least one first media content from a position below a metadata storage window following the first metadata writing storage window toward a bottom position of the plurality of fragments of the storage device according to a transmission sequence.

11. The storing method of claim 1, wherein the step of when the storage device reaches the storage limit and the at least one second media content and the corresponding at least one second metadata are intended continuously to be stored in the storage device, converting the first metadata writing storage window into the second metadata reserving storage window to reserve the at least one first metadata, and sequentially overwriting the at least one second fragment of the storage device with the at least one second media content and storing the corresponding at least one second metadata into the second metadata writing storage window of the storage device comprises:
when the storage device reaches the storage limit and the at least one second media content and the corresponding at least one second metadata are intended continuously to be stored in the storage device, converting a corresponding position following the first metadata writing storage window into the second metadata writing storage window to store the at least one second metadata, and overwriting stored metadata of the first metadata reserving storage window with at least one of the at least one second media content.

12. The storing method of claim 1, wherein the step of when the storage device reaches the storage limit and the at least one second media content and the corresponding at least one second metadata are intended continuously to be stored in the storage device, converting the first metadata writing storage window into the second metadata reserving storage window to reserve the at least one first metadata, and sequentially overwriting the at least one second fragment of the storage device with the at least one second media content and storing the corresponding at least one second metadata into the second metadata writing storage window of the storage device comprises:
when the storage device reaches the storage limit, the at least one second media content and the corresponding at least one second metadata are intended continuously to be stored in the storage device and the first metadata writing storage window is in a bottom position of a plurality of fragments of the storage device, converting a top position of the plurality of fragments of the storage device as a second metadata writing storage window to store the at least one second metadata.

13. The storing method of claim 1 further comprising:
when the video recording system stands by or shuts down, moving the first metadata reserving storage window and the first metadata writing storage window to a top position of a plurality of fragments of the storage device.

14. A processing device in a video recording system, for storing data in a storage device of the video recording system, the processing device comprising:
a processor, for execute a program; and
a memory, coupled to the processor, for store the program;
wherein the program instructs the processor to perform the following steps:
sequentially storing at least one first media content into at least one first fragment of the storage device, and storing corresponding at least one first metadata into a first metadata writing storage window of the storage device, wherein the at least one first fragment is outside of a first metadata reserving storage window and the first metadata writing storage window of the storage device; and
when the storage device reaches a storage limit and at least one second media content and corresponding at least one second metadata are intended continuously to be stored in the storage device, converting the first metadata writing storage window into a second metadata reserving storage window to reserve the at least one first metadata, and sequentially overwriting at least one second fragment of the storage device with the at least one second media content and storing the corresponding at least one second metadata into a second metadata writing storage window of the storage device, wherein the at least one second fragment is outside of the second metadata reserving storage window and the second metadata writing storage window;
wherein the first metadata writing storage window follows the first metadata reserving storage window, and the second metadata writing storage window follows the second metadata reserving storage window.

15. The processing device of claim 14, wherein the step of sequentially storing the at least one first media content into the at least one first fragment of the storage device, and storing the corresponding at least one first metadata into the first metadata writing storage window of the storage device further comprises:
processing the at least one first media content into a first audio and video file according to the at least one first metadata.

16. The processing device of claim 14, wherein the step of sequentially storing the at least one first media content into the at least one first fragment of the storage device, and storing the corresponding at least one first metadata into the first metadata writing storage window of the storage device further comprises:
when storing the at least one first media content and the corresponding at least one first metadata is interrupted, processing stored media content of the at least one first media content into an interrupted audio and video file according to stored metadata of the at least one first metadata.

17. The processing device of claim 14, wherein the program further instructs the processor to perform the following step:
calculating a cluster and a data bit rate of the storage device.

18. The processing device of claim 17, wherein the step of calculating the cluster and the data bit rate of the storage device comprises:
deciding a size of each fragment of the storage device corresponding to each media content; and
deciding a divided capacity of the storage device and calculating a capacity of the storage device for storing metadata according to the size of the each fragment.

19. The processing device of claim 18, wherein the step of deciding the divided capacity of the storage device and calculating the capacity of the storage device for storing metadata according to the size of the each fragment comprises:
deciding at least one metadata fragment of the storage device as the first metadata writing storage window, and calculating a number of metadata which the first metadata writing storage window stores mostly.

20. The processing device of claim 14, wherein the program further instructs the processor to perform the following step:
when triggering an emergency recording, reserving and locking at least one media content before and after triggering the emergency recording as at least one emergency media content, and processing the at least one emergency media content into an emergency recording file according to at least one emergency metadata corresponding to the at least one emergency media content.

21. The processing device of claim 20, wherein the program further instructs the processor to perform the following step:
when storing following media content after triggering the emergency recording, locking and not overwriting the at least one emergency media content and the at least one emergency metadata.

22. The processing device of claim 20, wherein the program further instructs the processor to perform the following step:
storing the emergency recording file to the storage device, and not overwriting the emergency recording file when storing following media content.

23. The processing device of claim 14, wherein the step of sequentially storing the at least one first media content into the at least one first fragment of the storage device, and storing the corresponding at least one first metadata into the first metadata writing storage window of the storage device further comprises:
when performing storing in an initial state, maintaining the first metadata writing storage window in a top position of a plurality of fragments of the storage device a, and sequentially storing the at least one first media content from a position below a metadata storage window following the first metadata writing storage window toward a bottom position of the plurality of fragments of the storage device according to a transmission sequence.

24. The processing device of claim 14, wherein the step of when the storage device reaches the storage limit and the at least one second media content and the corresponding at least one second metadata are intended continuously to be stored in the storage device, converting the first metadata writing storage window into the second metadata reserving storage window to reserve the at least one first metadata, and sequentially overwriting the at least one second fragment of the storage device with the at least one second media content and storing the corresponding at least one second metadata into the second metadata writing storage window of the storage device comprises:
when the storage device reaches the storage limit and the at least one second media content and the corresponding at least one second metadata are intended continuously to be stored in the storage device, converting a corresponding position following the first metadata writing storage window into the second metadata writing storage window to store the at least one second metadata, and overwriting stored metadata of the first metadata reserving storage window with at least one of the at least one second media content.

25. The processing device of claim 14, wherein the step of when the storage device reaches the storage limit and the at least one second media content and the corresponding at least one second metadata are intended continuously to be stored in the storage device, converting the first metadata writing storage window into the second metadata reserving storage window to reserve the at least one first metadata, and sequentially overwriting the at least one second fragment of the storage device with the at least one second media content and storing the corresponding at least one second metadata into the second metadata writing storage window of the storage device comprises:
when the storage device reaches the storage limit, the at least one second media content and the corresponding at least one second metadata are intended continuously to be stored in the storage device and the first metadata writing storage window is in a bottom position of a plurality of fragments of the storage device, converting a top position of the plurality of fragments of the storage device as a second metadata writing storage window to store the at least one second metadata.

26. The processing device of claim 14, wherein the program further instructs the processor to perform the following step:
when the video recording system stands by or shuts down, moving the first metadata reserving storage window and the first metadata writing storage window to a top position of a plurality of fragments of the storage device.

* * * * *